(12) United States Patent
Tamura et al.

(10) Patent No.: US 7,828,330 B2
(45) Date of Patent: Nov. 9, 2010

(54) VEHICLE FRONT BODY STRUCTURE

(75) Inventors: Naoyuki Tamura, Wako (JP); Patrick Ellison, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 12/322,516

(22) Filed: Feb. 3, 2009

(65) Prior Publication Data

US 2009/0230665 A1   Sep. 17, 2009

(30) Foreign Application Priority Data

Mar. 17, 2008 (JP) .......................... P2008-067977
Apr. 17, 2008 (JP) .......................... P2008-108149

(51) Int. Cl.
*B62D 21/15* (2006.01)
*B62D 21/11* (2006.01)
*B62D 25/08* (2006.01)

(52) U.S. Cl. ............. 280/788; 296/193.09; 296/203.02; 280/784; 280/124.109

(58) Field of Classification Search ............ 296/187.09, 296/187.1, 193.09, 193.07, 204, 203.02; 280/784, 781, 788, 124.109; 180/274
See application file for complete search history.

(56) References Cited

U.S. PATENT DOCUMENTS 7,144,073 B2 * 12/2006 Uchida .................. 296/203.02

2006/0006699 A1 * 1/2006 Matsuyama et al. .... 296/203.02

FOREIGN PATENT DOCUMENTS

| JP | 64-22686 | | 2/1989 |
|---|---|---|---|
| JP | 05-085410 | | 4/1993 |
| JP | 6-255532 | A * | 9/1994 |
| JP | 9-123943 | A | 5/1997 |
| JP | 2656794 | B2 | 9/1997 |
| JP | 2002-240738 | | 8/2002 |
| JP | 2007-186125 | | 7/2007 |

* cited by examiner

*Primary Examiner*—Ruth Ilan
(74) *Attorney, Agent, or Firm*—Carrier, Blackman & Associates P.C.; Joseph P. Carrier; William D. Blackman

(57) ABSTRACT

Vehicle front body structure includes, in each of its left and right sections, a damper housing having mounted thereon an upper portion of a suspension damper; a front side frame having the housing attached thereto; a damper housing connection bracket inserted in an opening of the frame; a welding section formed on the housing and fixed to the bracket; a lid fitted in the opening to form the frame as a closed-sectional-shape structure. The body structure also includes a collar nut provided within the side frame and supporting a sub frame, and each of the housings has a lower section connected to the collar nut.

5 Claims, 20 Drawing Sheets

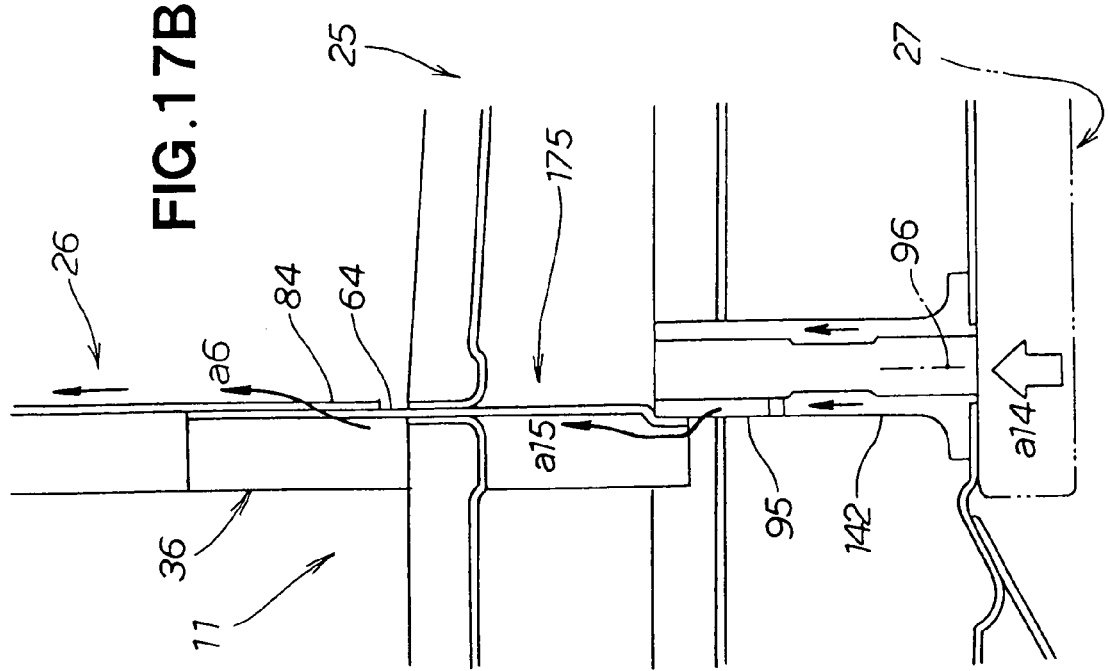
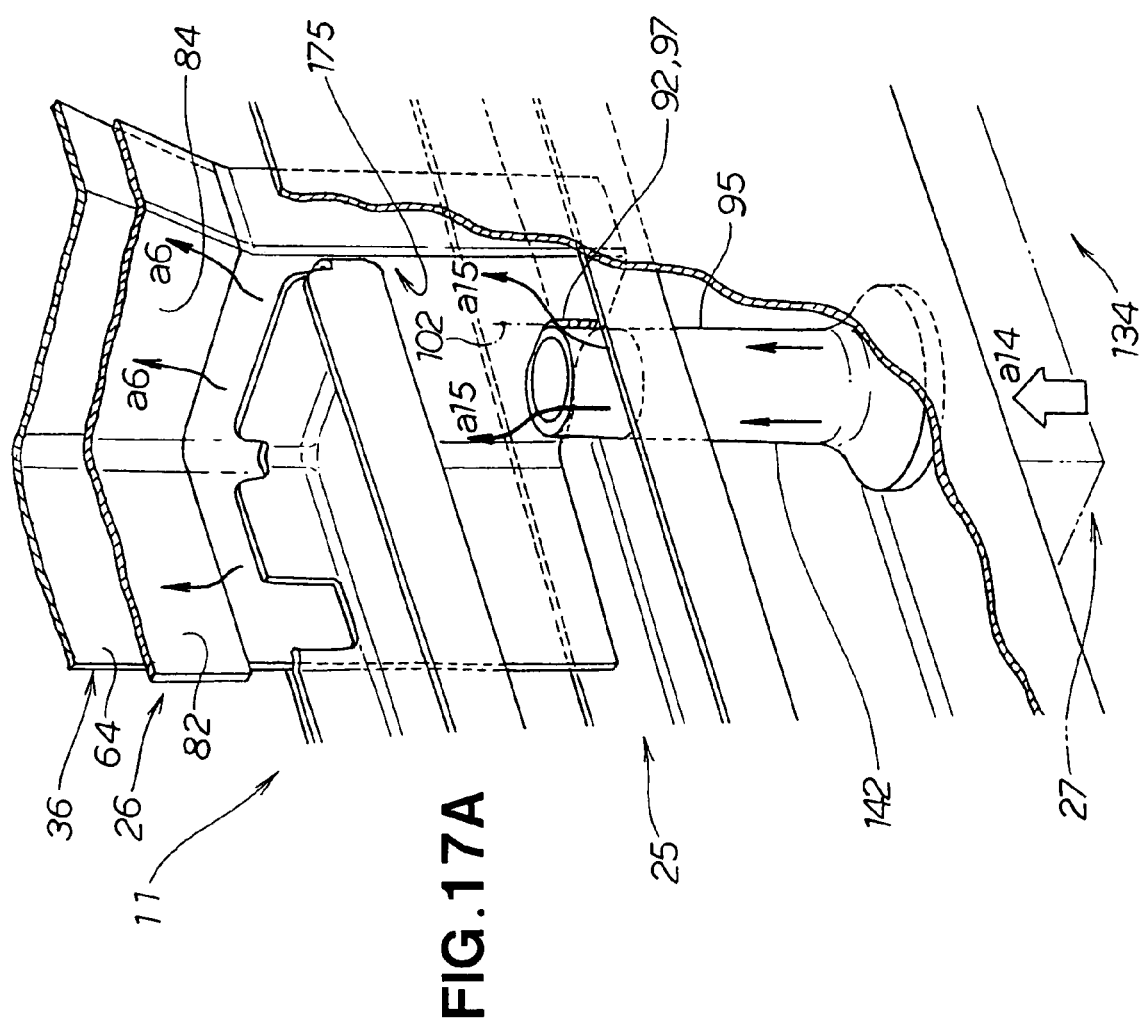

VEHICLE FRONT BODY STRUCTURE

FIELD OF THE INVENTION

The present invention relates to vehicle front body structures to which a load transmits from front a suspension, and in which a sub frame having an engine and front suspensions placed thereon is connected from below to front side frames of an engine room.

BACKGROUND OF THE INVENTION

Among the conventionally-known vehicle front body structures are ones where damper housings each for mounting a damper of a front suspension are inserted in respective front side frames, each of which has a channel sectional shape and disposed near a left or right front wheel to extend in a front-rear direction of the vehicle, to thereby achieve an increased strength of the front side frames. One example of such vehicle front body structures is disclosed in Japanese Patent Application Laid-Open Publication No. HEI-05-85410 (JP 05-85410 A). In the vehicle front body structure disclosed in JP 05-85410 A, however, each of the damper housings is of a dual structure comprising two plates disposed in substantial parallel to each other. Thus, the disclosed front body structure is complicated in construction and time-consuming to manufacture. Further, in the disclosed front body structure, loads from the damper housings would concentrate on inserting joint sections of the corresponding front side frames in which respective underside portions of the damper housings are inserted, so that the front side frames tend to be deformed easily.

Also known are vehicle front body structures where a sub frame is mounted to left and right front side frames of an engine room. For example, a rectangular sub frame is connected at its two front intersecting sections to the front side frames from below in such a manner that the sub frame is collapsible at its opposed intermediate portions at the time of collision against an external object. One example of such vehicle front body structures is disclosed in Japanese Patent Application Laid-Open Publication No. 2002-240738 (JP 2002-240738 A).

Also known are vehicle front body structures where front side frames and a sub frame are fixedly interconnected via front and rear connection members in such a manner that the sub frame is deformable downward at the time of collision against an external object. One example of such vehicle front body structures is disclosed in Japanese Patent Application Laid-Open Publication No. 2007-186125 (JP 2007-186125 A).

However, the vehicle front body structures disclosed in JP 2002-240738 A and JP 2007-186125 A would present the problem that, as an upward load is applied from the sub frame to the front side frames, connection sections of the front side frames easily collapse inwardly.

SUMMARY OF THE INVENTION

In view of the foregoing prior art problems, it is an object of the present invention to provide an improved vehicle front body structure of which front side frames can be manufactured with ease, which can minimize deformation of the front side frames and damper housings and can achieve an increased strength of the front side frames supporting a sub frame, and which can achieve an increased strength of connection between the front side frames and the damper housings and a simplified construction of the damper housings.

In order to accomplish the above-mentioned object, the present invention provides an improved vehicle front body structure, which comprises: left and right damper housings having mounted thereto respective upper portions of left and right front suspension dampers; left and right front side frames having respective ones of the left and right damper housings attached thereto, each of the left and right front side frames having a side frame body of a substantially U sectional shape with an upwardly oriented opening; left and right damper housing connection brackets each inserted in the opening of the side frame body of a corresponding one of the left and right front side frames and thereby fixed to the side frame body of the corresponding left or right front side frame; left and right welding connection sections each formed on the corresponding left or right damper housing in such a shape as to be snugly fixed to a corresponding one of the damper housing connection brackets; and left and right lid members each fitted in the opening of the side frame body of the corresponding left or right front side frame to thereby form the front side frame as a structure of a closed sectional shape.

The use of the damper housing connection brackets allows the front side frames to be assembled and welded separately from the damper housings, and thus, each of the front side frames can be handled and manufactured with ease. Further, by the provision of the damper housing connection brackets, side frame bodies and lid members, a load applied from the damper housing can be transmitted to the front side frame while being distributed over a wide range in each of left and right side sections of the vehicle front body structure. Thus, unwanted deformation of the damper housings and front side frames can be minimized.

In an embodiment, each of the damper housing connection brackets comprises a corner member formed by bending a steel plate and having a rib section partitioning the inside space of the corresponding left or right front side frame, and corner portions of the left and right damper housings are lapped over the corner members of respective ones of the left and right damper housing connection brackets. With such an arrangement, it is possible to increase not only the strength of the front side frame but also the strength of connection between the front side frame and the damper housing. Further, because the aforementioned arrangement is employed, the body of the damper housing can be plastically formed of a single steel plate, and thus, the damper housing can be significantly simplified in construction.

The vehicle front body structure of the present invention further comprises a sub frame fixedly connected from below to the left and right front side frames; collar nuts provided within the left and right front side frames, respectively, and projecting upward from the front side frames to support the sub frame, each of the damper housings having a lower section connected to a corresponding one of the collar nuts.

Because each of the damper housings has the lower section connected to the corresponding collar nut projecting upward from the front side frame, each of the collar nuts can be supported by the corresponding damper housing having a great strength, and thus, the front side frames supporting the sub frame can have an increased strength. Namely, in each of the left and right side sections of the vehicle front body structure, once a load is applied from the front suspension to the collar nut within the front side frame via the sub frame, the load transmits to the damper housing's lower section connecting to an upper portion of the collar nut, and, as a consequence, the load can be advantageously borne by the damper housing.

Preferably, the lower section of each of the left and right damper housings is provided as a wall-shaped bulkhead structure that partitions the inside space of the corresponding left or right front side frame in a width direction of the vehicle. With such a wall-shaped bulkhead structure provided in each of the front side frames and partitioning the inside space of the front side frame in the width direction of the vehicle, it is possible to even further increase the strength of the front side frame supporting the sub frame. In each of the left and right side sections of the vehicle front body structure, once a load is applied from the front suspension to a lower portion of the collar nut within the front side frame via the sub frame, the load transmits from an upper portion of the collar nut to the damper housing and front side frame by way of the bulkhead structure connecting to the upper portion of the collar nut. As a consequence, the load can be advantageously borne by the damper housing and front side frame.

Preferably, the vehicle front body structure of the present invention further comprises left and right brackets for fixedly connecting the collar nuts to the bulkhead structures of the left and right damper housings. Thus, in a case where the lower section of each of the damper housings is connected to the outer surface of the corresponding collar nut, the bracket is preferably disposed so as to radially sandwich the collar nut to support the collar nut, so that a load can be transmitted even more reliably to the damper housing.

In an embodiment, the lower section of each of the damper housings is fixed to the corresponding collar nut by welding at a welding portion, and the welding portion has a welding axis parallel to an axis of the collar nut. Thus, as a load is applied from the collar nut to the damper housing's lower section, it can be directed by the welding portion along the ridge line of the damper housing's lower section. Thus, the present invention allows a greater load to be transmitted to the damper housing's lower section with no problem.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIGS. 17A and 17B are views which are explanatory of a load transmission mechanism in the first embodiment of the vehicle front body structure;

DETAILED DESCRIPTION OF THE PREFERRED EMBODIMENTS

Figure 1:
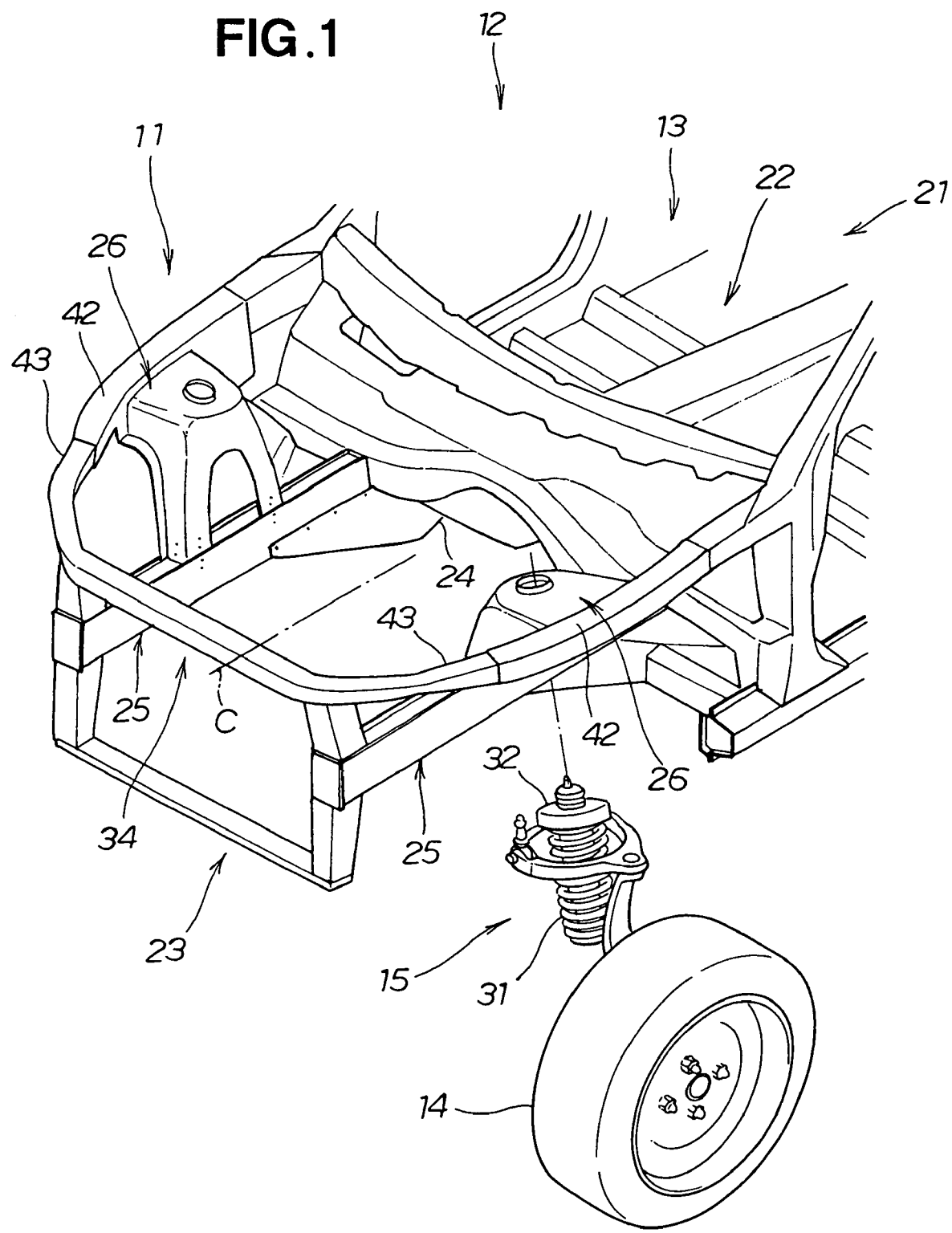
FIG. 1 is a perspective view showing a first embodiment of a vehicle front body structure of the present invention.

Reference is now made to FIG. 1 showing in perspective a first embodiment of a vehicle front body structure 11 of the present invention. In the vehicle front body structure 11, front suspensions 15 (only one of which is shown in the figure) each having a front wheel 14 mounted thereon and a not-shown engine are supported by a front section of a body 13 of a vehicle 12, as will be detailed later.

The vehicle body 13 includes an under body 22 defining a floor of a vehicle compartment 21, and a front body 23. The front body 23 includes left and right front side frames 25 connecting to a front floor frame 24 of the under body 22, and damper housings 26 mounted to the respective front side frames 25, and the front body structure 11 with combined reference to FIGS. 1-4.

Upper mounting section 32 of a damper 31 of the front suspension 15 (i.e., front suspension damper 31) is fixed to each of the damper housings 26 by means of bolts and nuts in a conventionally-known manner.

The vehicle front body structure 11 is constructed substantially symmetrically about a longitudinal centerline C of the vehicle 12, and thus, the following description will be made primarily about elements in a right half section 34 of the vehicle front body structure 11.

Figure 2:
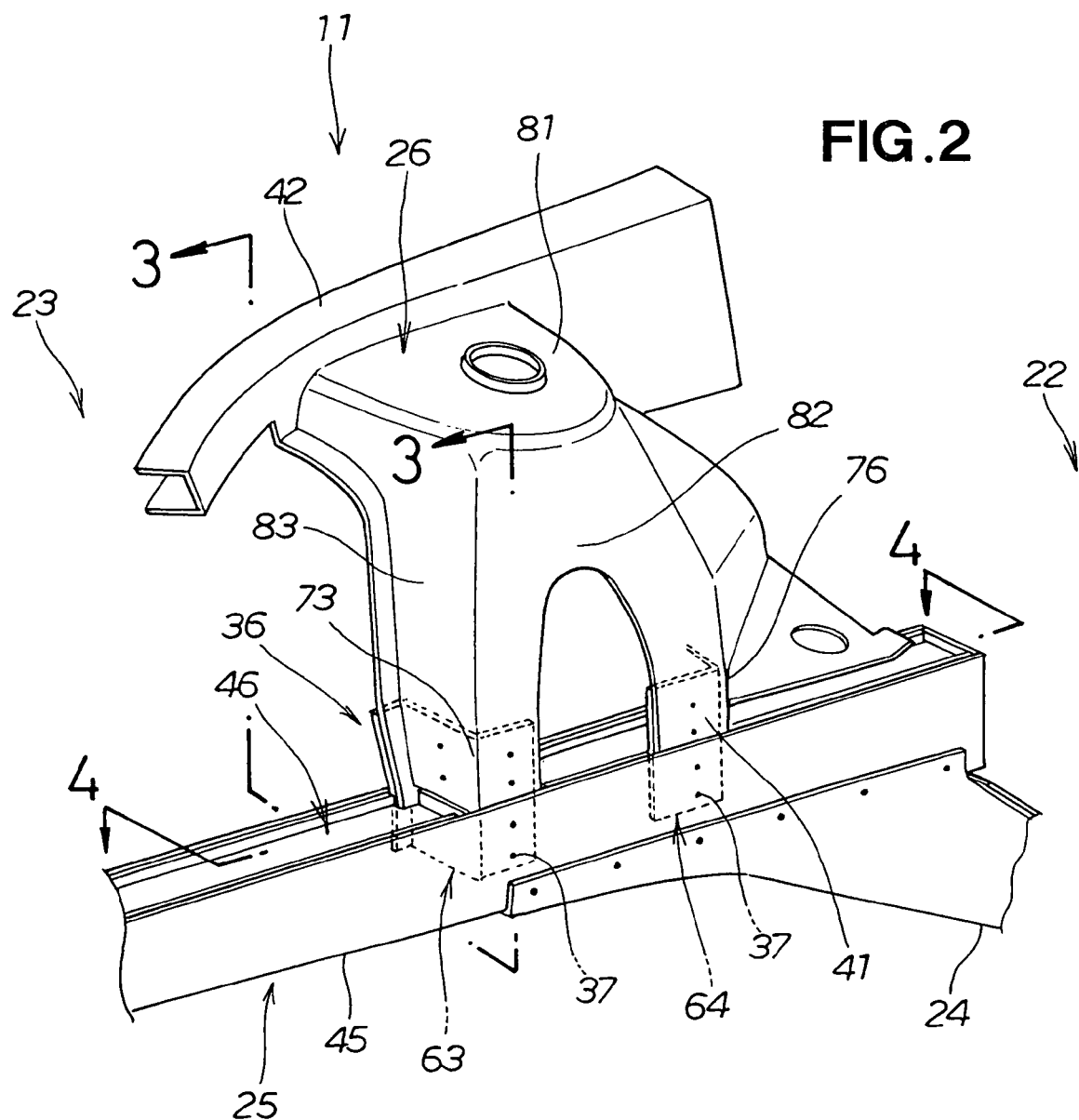
FIG. 2 is a perspective view showing how a damper housing is fixedly connected to a corresponding front side frame.
Figure 3:
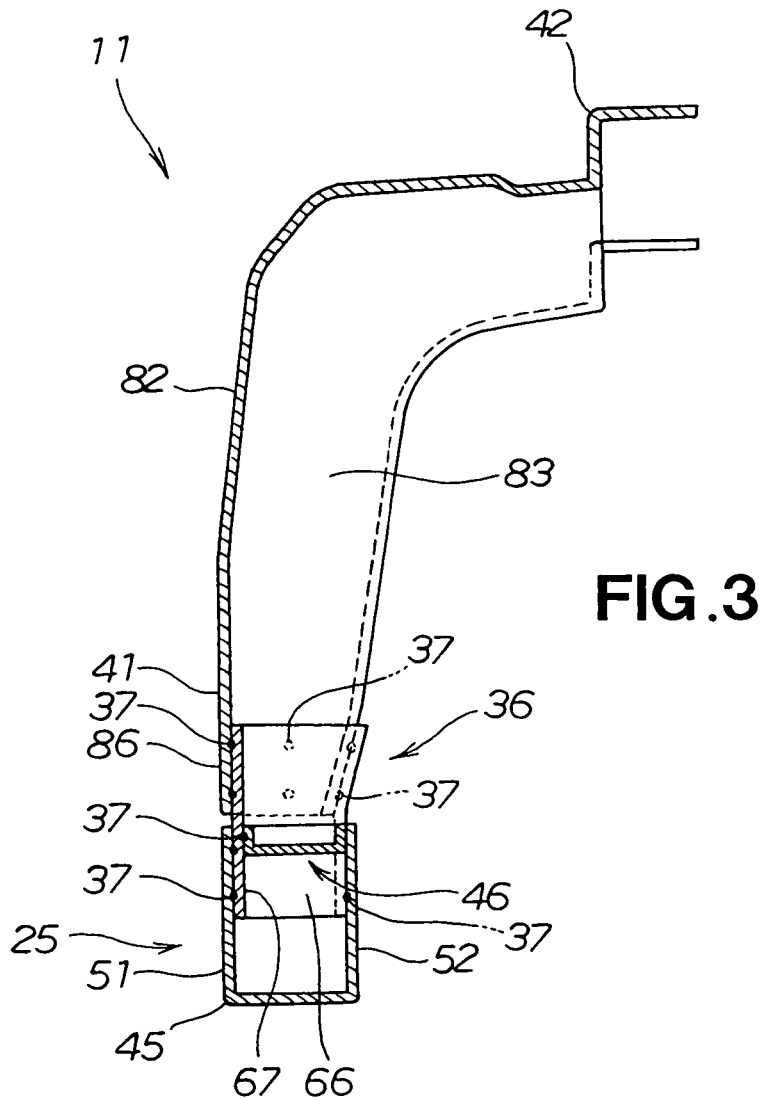
FIG. 3 is a sectional view taken along line 3-3 of FIG. 2.
Figure 4:
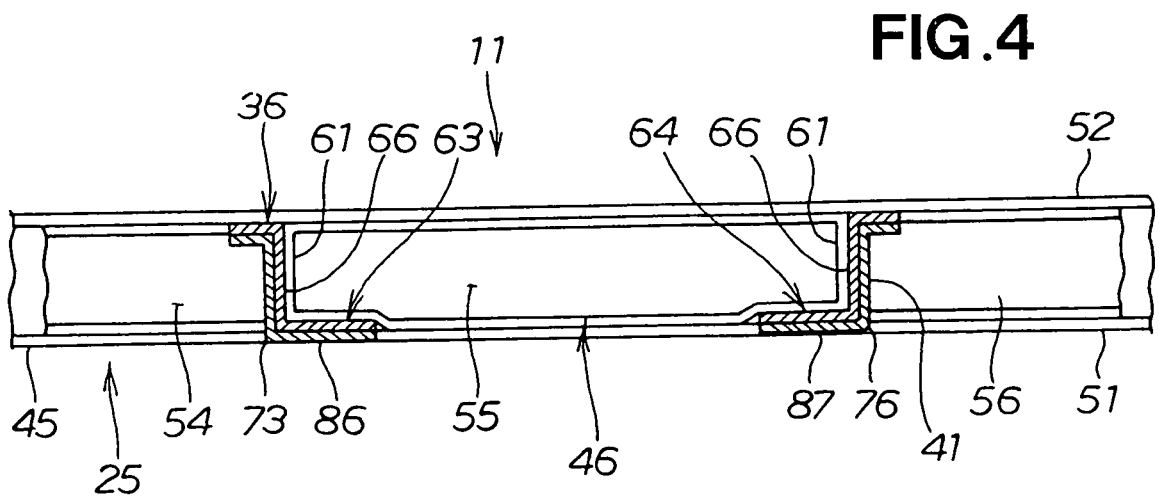
FIG. 4 is a sectional view taken along line 4-4 of FIG. 2.

Reference is made next to FIG. 2 showing in perspective how the damper housing 26 is fixedly connected to the corresponding front side frame 25, to FIG. 3 which is a sectional view taken along line 3-3 of FIG. 2, and to FIG. 4 which is a sectional view taken along line 4-4 of FIG. 2.

In the vehicle front body structure 11, a damper housing connection bracket 36 is fixed to the right front side frame 25 through spot welding at welding portions 37, a lower section 41 of the damper housing 26 is fixed to the damper housing connection bracket 36 through spot welding at welding portions 37, an upper section of the damper housing 26 is fixed to an upper wheel-house member 42 that is in turn attached to an upper bulkhead member 43. Further, a lid member 46 is fixed to a side frame body 45 of the front side frame 25.

Figure 5:
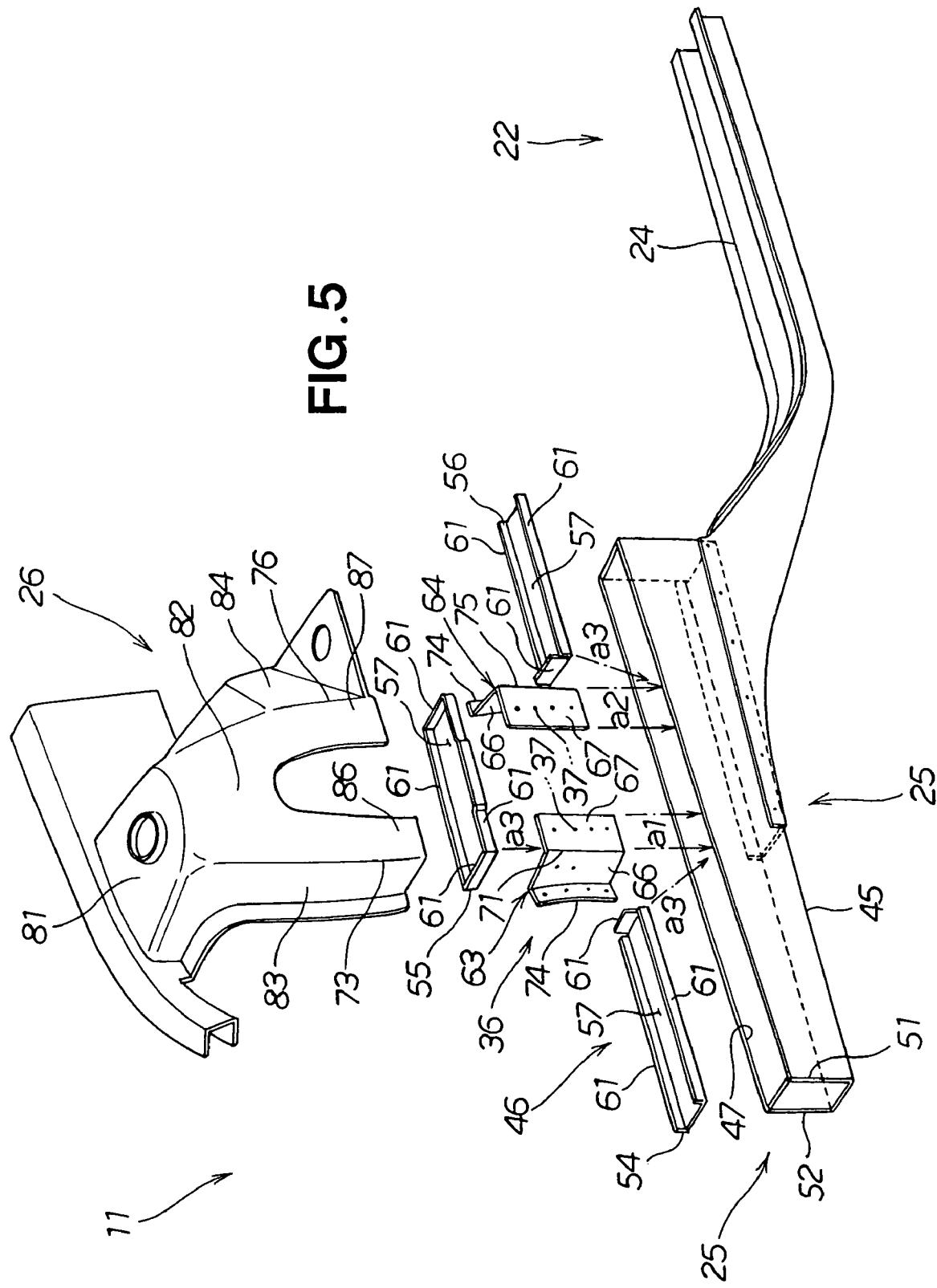
FIG. 5 is an exploded perspective view of the vehicle front body structure of the present invention.

FIG. 5 is an exploded perspective view of the vehicle front body structure 11. The side frame body 45 is an elongated member of a generally U sectional shape having an upwardly oriented opening 47. The lid member 46 is fitted in the opening 47 between first and second side wall portions 51 and 52 of the side frame body 45, to thereby form a closed sectional shape as seen in FIG. 3.

The lid member 46, which has a substantially U sectional shape, comprises a front lid section 54, intermediate lid section 55 and rear lid section 56. Each of the lid sections 54, 55 and 56 has a closing bottom portion 57 to be fitted in the opening 47, and welding edge portions 61 formed integrally with the closing bottom portion 57 and projecting upward to be welded to the side frame body 45 and damper housing connection bracket 36.

The damper housing connection bracket 36 includes a front corner member 63 located on a front region of the vehicle 12, and a rear corner member 64 spaced rearwardly a predetermined distance from the front corner member 63. Although the front corner member 63 and the rear corner member 64 are shown as separate members, these corner members 63 and 64 may be formed integrally with each other.

The front corner member 63 is a member formed by bending a steel plate into a substantially Z sectional shape and has a rib section 66 formed on a middle region thereof into such a predetermined width as to be fitted between the first and second side wall portions 51 and 52 of the front side frame body 45. The front corner member 63 also has a first overlapping section 67 of a plate shape formed perpendicularly to the rib section 66 and overlapping with the first side wall portion 51 of the front side frame 25. The rib section 66 and the first overlapping section 67 together define an L sectional shape to thereby form a front corner portion 71 that engages with a front corner portion 73 of the damper housing 26.

The front corner member 63 also has a second overlapping section 74 of a plate shape formed perpendicularly to the rib section 66 and overlapping with the second side wall portion 52 of the front side frame 25. The front corner member 63 is connected at its lower portion to the front side frame 25 and connected at its upper portion to the damper housing 26.

The rear corner member 64 is constructed similarly to the front corner member 63 and has similar elements to those of the front corner member 63. The rear corner member 64 has a rib section 66 and first overlapping section 67 together defining an L sectional shape to thereby form a rear corner portion 75 that engages with a rear corner portion 76 of the damper housing 26. The front and rear corner members 63 and 64 each have spot welding portions 37.

The body of the damper housing 26 is plastically formed as an integral piece. The damper housing 26 has a damper connecting upper portion 81 for connection with a front suspension damper 31, an inner wall portion 82 integrally formed with the damper connecting upper portion 81, and front and rear wall portions 83 and 84 formed integrally with the inner wall portion 82.

Lower end regions of the inner wall portion 82, front wall portion 83 and front corner portion 73 together constitute a front welding connection section 86, and lower end regions of the inner wall portion 82, rear wall portion 84 and rear corner portion 76 together constitute a rear welding connection section 87.

Although the front welding connection section 86 and rear welding connection section 87 in the illustrated example are spaced from each other with a lower opening of the inner wall portion 82 interposed therebetween, these welding connection sections 86 and 87 may be formed integrally with each other. However, forming the front welding connection section 86 and rear welding connection section 87 in spaced apart relation to each other with the lower opening of the inner wall portion 82 interposed therebetween can reduce the weight of the damper housing 26.

Figure 6:
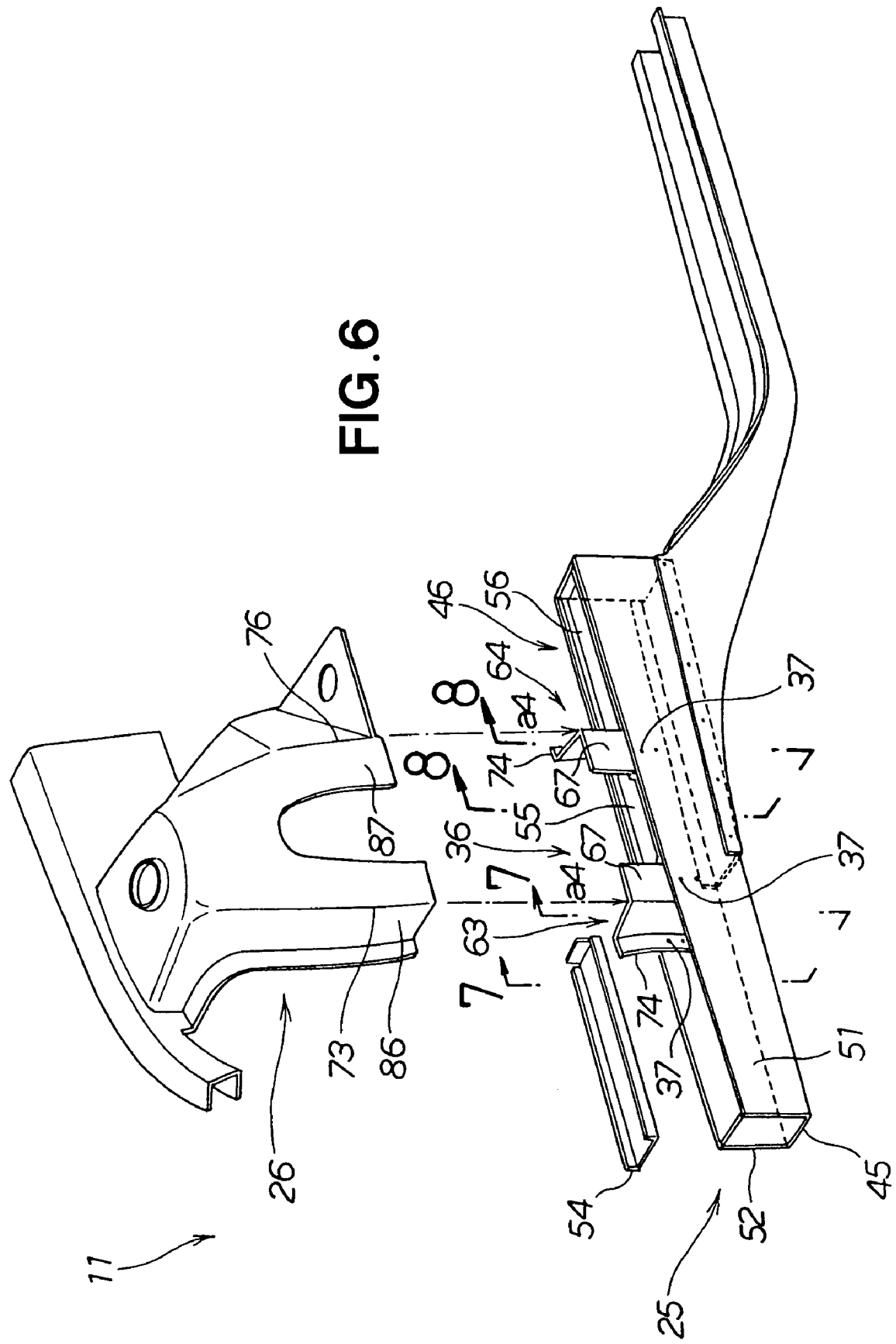
FIG. 6 is a view explanatory of a manner in which the vehicle front body structure of the invention is manufactured.
Figure 7:
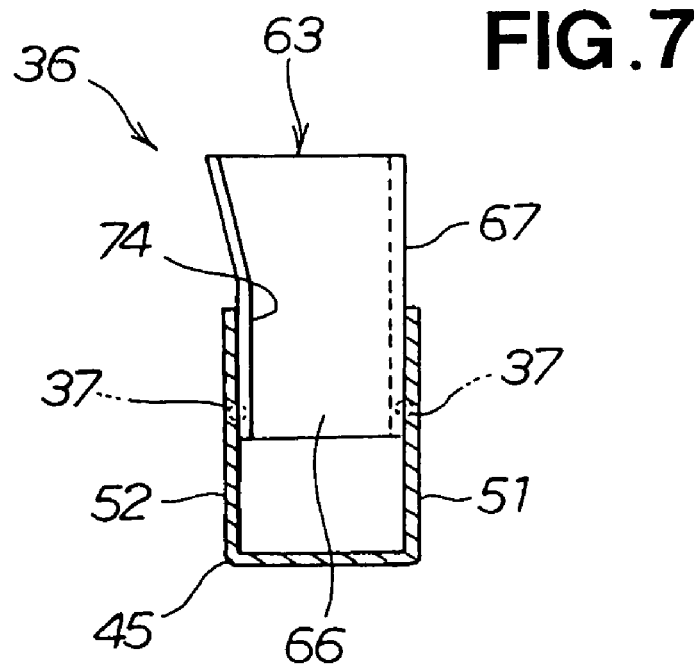
FIG. 7 is a sectional view taken along line 7-7 of FIG. 6.
Figure 8:
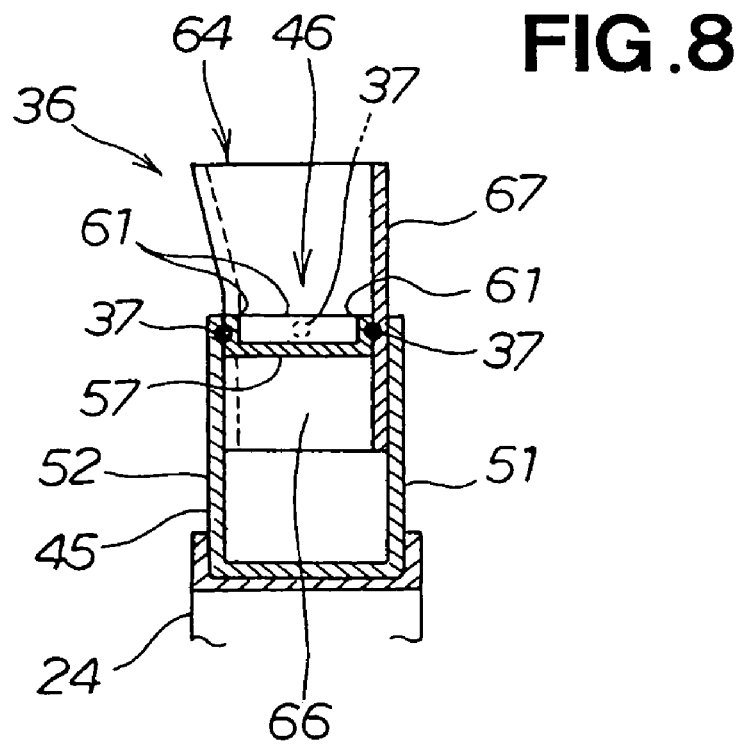
FIG. 8 is a sectional view taken along line 8-8 of FIG. 6.

Next, with combined reference to FIGS. 3-8, a description will be given about how the vehicle front body structure 11 is manufactured, and about behavior of the vehicle front body structure 11. FIG. 6 is a view explanatory of a manner in which the vehicle front body structure 11 is manufactured, FIG. 7 is a sectional view taken along the 7-7 line of FIG. 6, and FIG. 8 is a sectional view taken along the 8-8 line of FIG. 6.

The following paragraphs describe a front-side-frame assembling/welding step performed after the side frame body 45, damper housing connection bracket 36 and lid member 46 are plastically formed, as well as a damper-housing forming step. Let it be assumed that a step of fixing the front floor frame 24 to the side frame body 45 has already been completed.

In the front-side-frame assembling/welding step, the damper housing connection bracket 36 is first fitted in the side frame body 45 as indicated by arrows a1 and a2 (FIG. 5) and then welded to the side frame body 45.

More specifically, the respective first overlapping sections 67 of the front and rear corner members 63 and 64 of the damper housing connection bracket 36 are lapped over the first side wall portion 51 of the side frame body 45 and fixed to the first side wall portion 51 through spot welding at the welding portions 37. Further, the respective second overlapping sections 74 of the front and rear corner members 63 and 64 are lapped over and fixed to the second side wall portion 52 of the side body 45 by spot welding at the welding portions 37.

Then, the lid member 46 is fitted, as indicated by arrow a3, in the side frame body 45 to which the damper housing connection bracket 36 has been fixed, and then fixed to the side frame body 45 by welding.

More specifically, the welding edge portions 61 formed on and projecting upward from the intermediate lid section 55 are lapped over the first and second side wall portions 51 and 52 of the side frame body 45 and fixed to the wall portions 51 and 52 by welding at the welding portions 37. Simultaneously, the welding edge portions 61 are lapped over the front and rear corner members 63 and 64 and fixed to the corner members 63 and 64 by welding at the welding portions 37.

In the damper-housing forming step, which is performed separately from the aforementioned front-side-frame assembling/welding step, a single steel plate is pressed via a die to provide the damper housing 26. Alternatively, an aluminum alloy may be pressed or cast to provide the damper housing 26.

Finally, the damper housing 26 is lapped over the damper housing connection bracket 36, having been fixed to the front side frame 25, in a direction as indicated by arrow a4 (FIG. 6) or from sideways or from oblique above. At that time, the front and rear corner portions 73 and 74 of the damper housing 26 are lapped over upper portions of the front and rear corner members 63 and 64, respectively, and then fixed to the upper portions through spot welding at the welding portions 37.

According to the vehicle front body structure 11, where the use of the damper housing connection bracket 36 allows the front side frame 25 to be assembled and welded separately from the damper housing 26, the front side frame 25 can be manufactured with ease. Further, the body of the damper housing 26 can be constructed as an integral unit and thus can be manufactured with ease.

Whereas the front and rear corner members 63 and 64 have been described as lapped over the inner surface of the damper housing 26, these corner members 63 and 64 may be lapped over the outer surface of the damper housing 26.

Figure 9A:
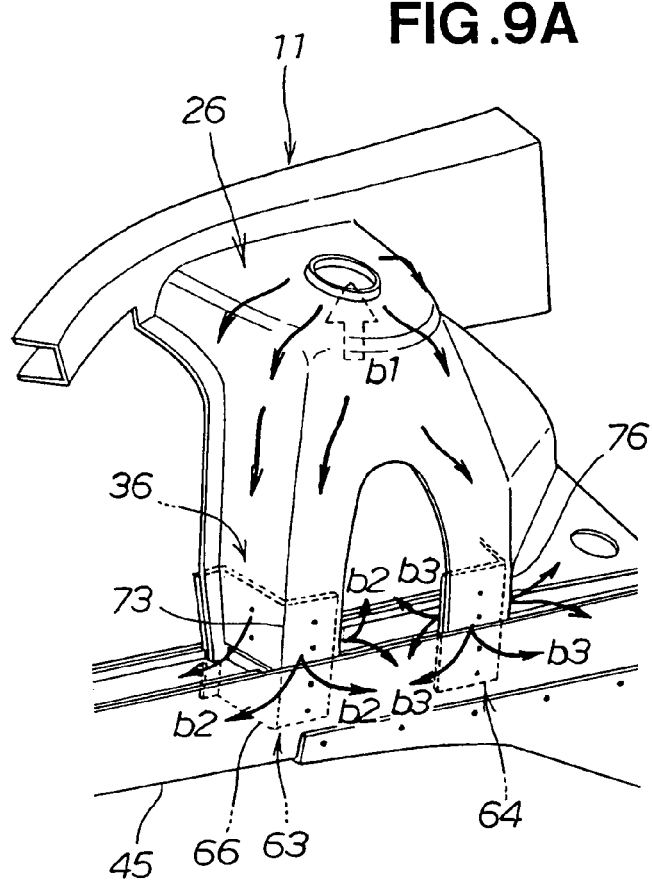
FIGS. 9A-9C are views explanatory of a mechanism for responding to a load applied from a front suspension damper of the vehicle front body structure.
Figure 9B:
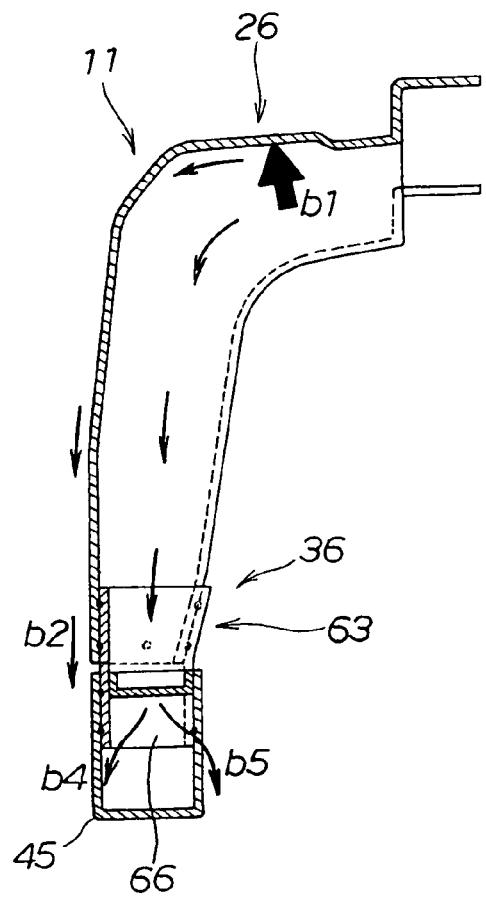
Figure 9C:
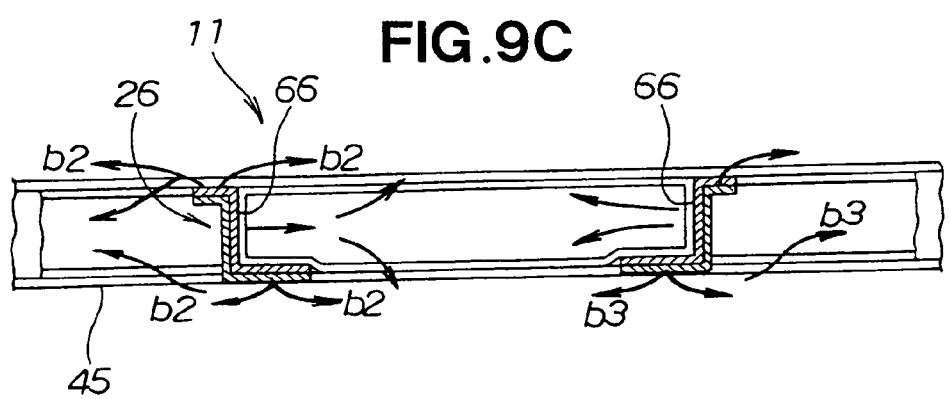

FIGS. 9A-9C are views explanatory of a mechanism for responding to a load applied from the front suspension damper 31 of the vehicle front body structure 11, of which FIG. 9A corresponds to FIG. 2, FIG. 9B corresponds to FIG. 3 and FIG. 9C corresponds to FIG. 4. The mechanism will be described with combined reference to FIGS. 1, 5 and 9A-9C.

Once a load is applied from the front suspension damper 31 to the damper housing 26 as indicated by arrow b1, the damper housing connection bracket 36 distributively transmits the load from the damper housing 26 to the side frame body 45 as indicated by arrow b2 and b3, so that unwanted deformation of the damper housing 26 and side frame body 45 can be minimized.

Further, because the rib sections 66 of the damper housing connection bracket 36 distributively transmit the load to the side frame body 45 as indicated by arrow b4 and b5, not only the side frame body 45 can have an increased strength, but also the strength of connection between the rib sections 66 and the side frame body 45 can be increased.

Furthermore, in the vehicle front body structure 11, where the front and rear corner members 63 and 64 of the damper housing connection bracket 36 are lapped over the front and rear corner portions 73 and 76, respectively, of the damper housing 26, the damper housing connection bracket 36 can not only increase the strength of the lower portion (i.e., front welding connection section 86 and rear welding connection section 87) of the damper housing 26 but also increase the strength of connection between the damper housing connection bracket 36 and the lower portion (i.e., front welding connection section 86 and rear welding connection section 87) of the damper housing 26.

Furthermore, the body of the damper housing 26 can be constructed as an integral unit and thus can be simplified in construction.

Figure 10:
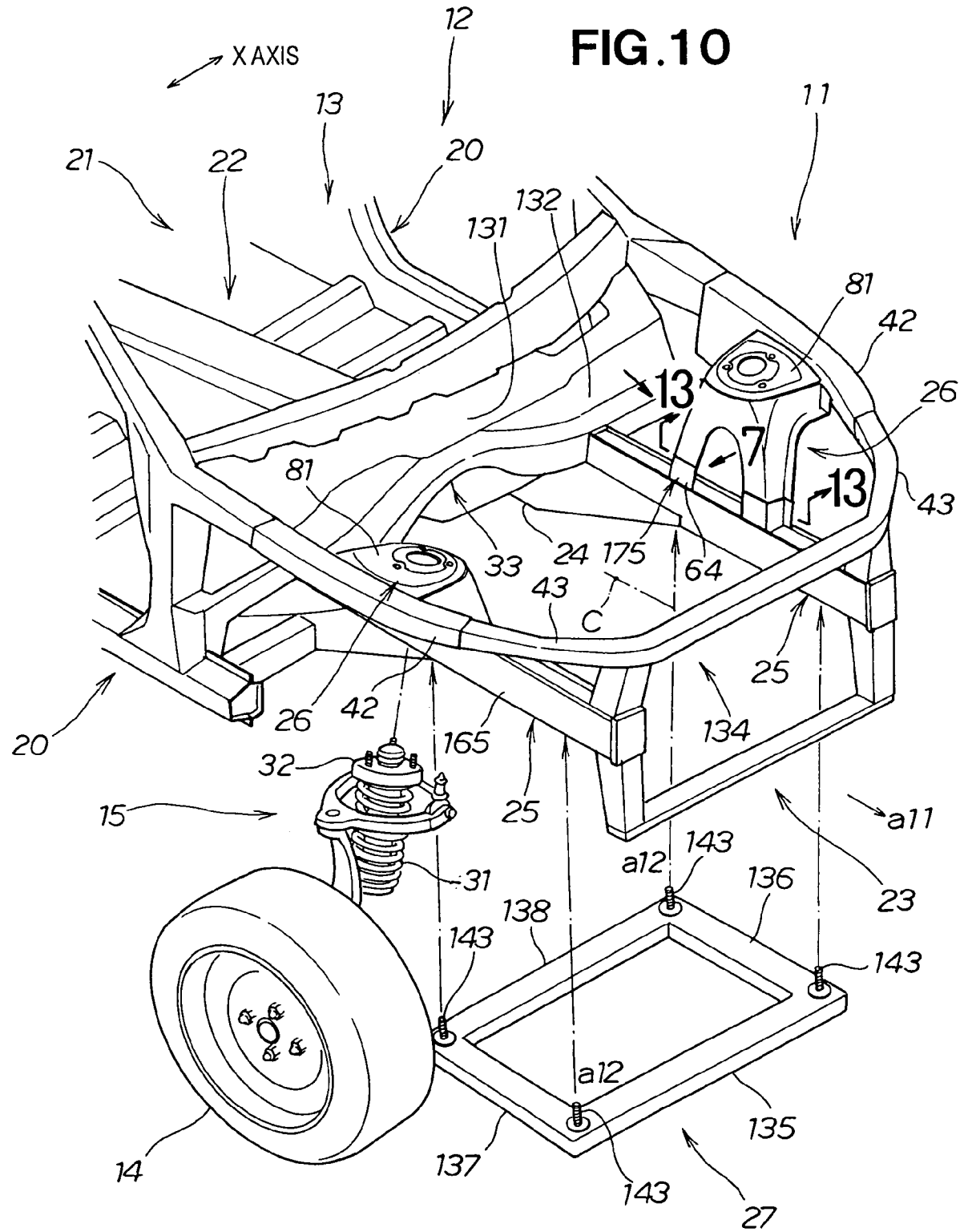
FIG. 10 is a perspective view showing further details of the first embodiment of the vehicle front body structure of the present invention.

FIG. 10 is an exploded perspective view showing further details of the first embodiment of the vehicle front body structure 11 of the present invention. In FIG. 10 side bodies 20 define side walls of the vehicle compartment 21, and the front body 23 includes a sub frame 27 of a rectangular shape.

The front body 23 also includes a dashboard cross member 33 connecting to a lower portion 132 of a dashboard lower panel 131 defining a front wall of the vehicle compartment 21, and the left and right front side frames 25 are located to the left and right, respectively, of an engine room 134 and extend from the dashboard cross member 33 toward the front of the vehicle 12 as indicated by arrow a11.

The sub frame 27 is of a conventionally-known construction, which comprises first to fourth frame portions 135-138. The sub frame 27 is raised from below the front body 23 as indicated by arrow a12 to be fastened to front and rear collar nuts 141 and 142 (see FIG. 12) provided on the front side frames 25 by means of connection members 143.

Each of the damper housings 26 includes the damper connecting upper portion 81 to which is fixed the upper mounting section 32 of the damper 31 of the front suspension 15 by means of bolts and nuts in a conventionally-known manner.

The vehicle front body structure 11 is constructed substantially symmetrically about a longitudinal centerline C of the vehicle 12, and thus, the following description will be made primarily about elements in the left half section of the vehicle front body structure 11.

Figure 11:
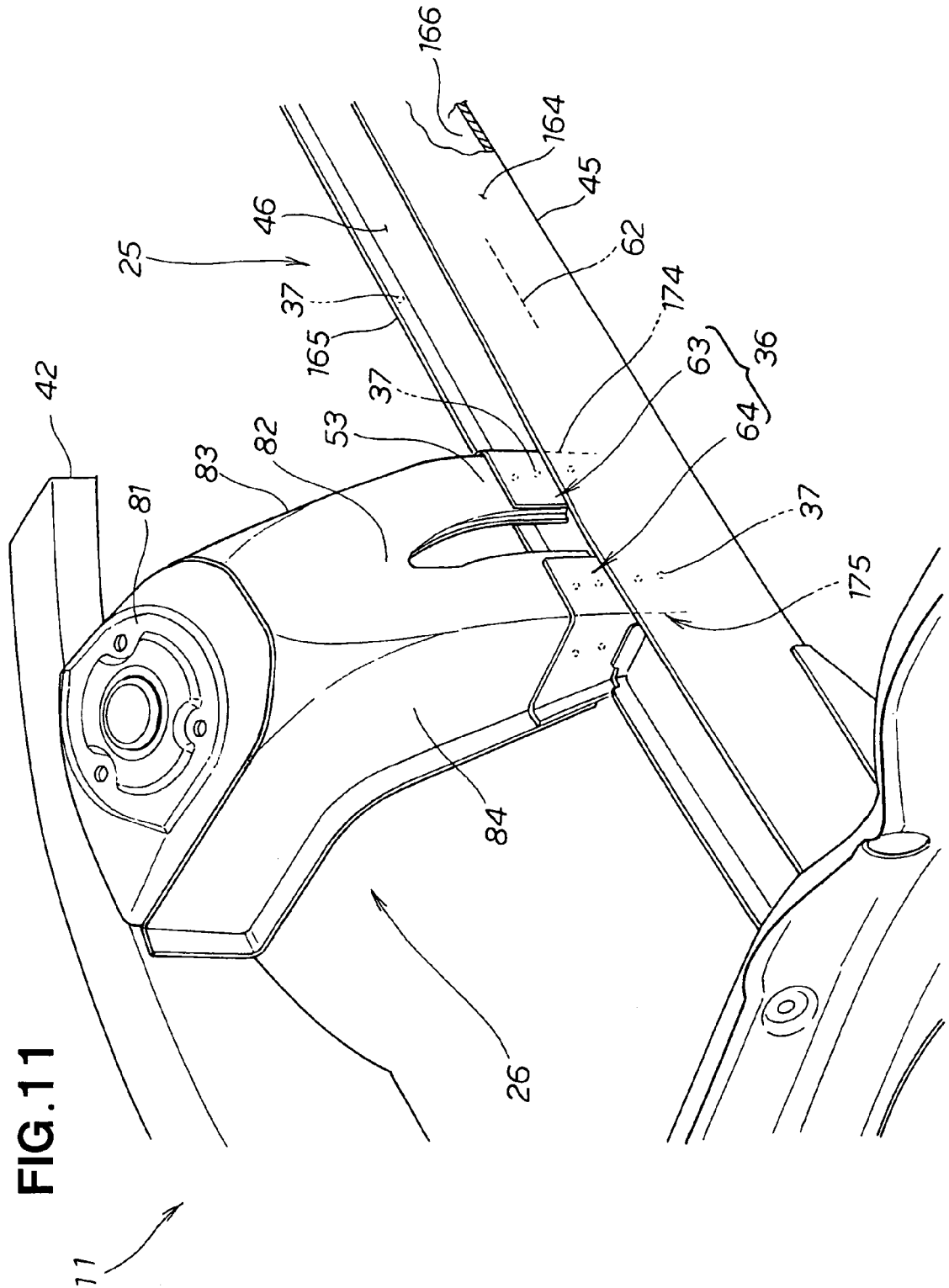
FIG. 11 is a perspective view of a left front side frame and a corresponding damper housing provided in the vehicle front body structure.
Figure 12:
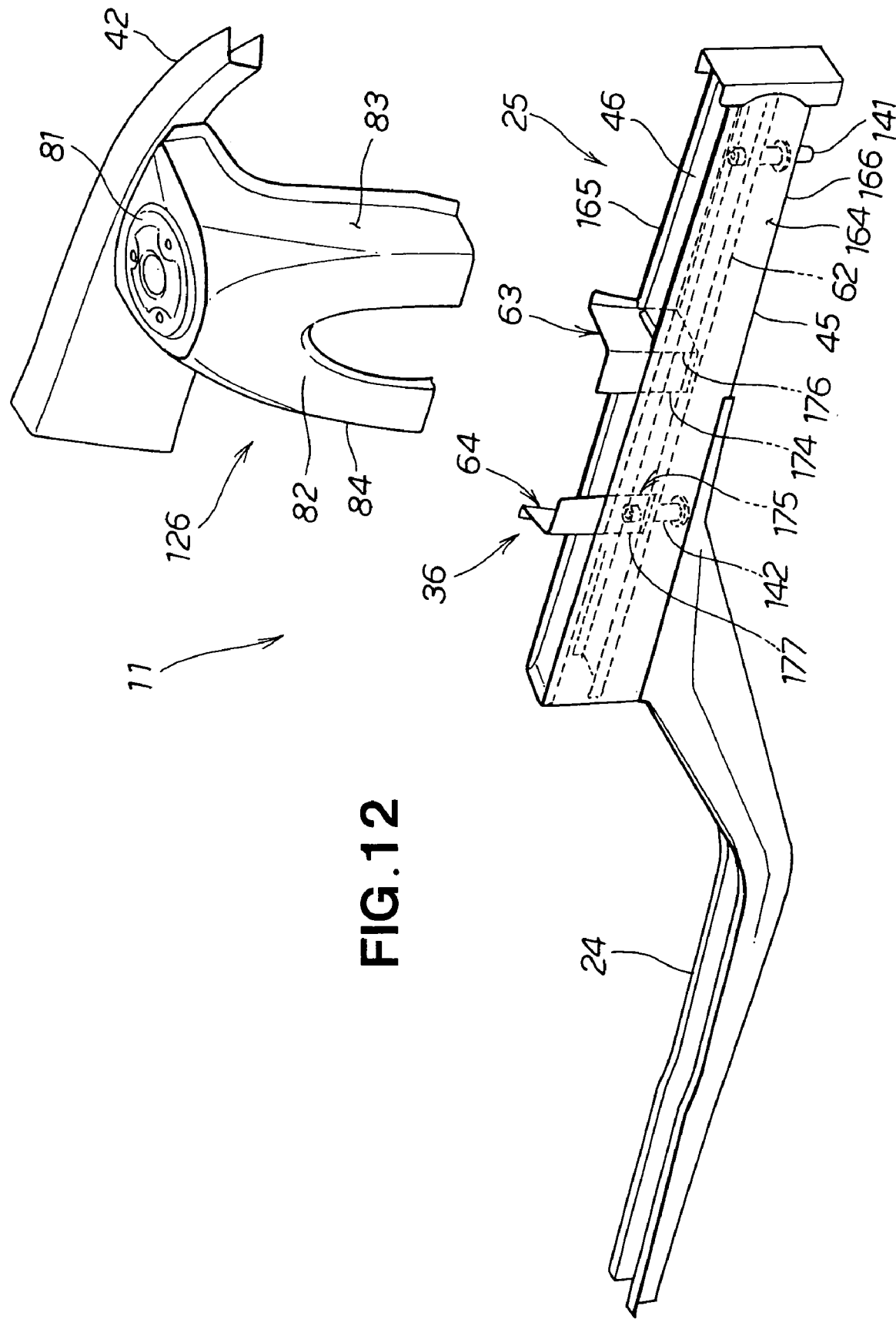
FIG. 12 is a perspective view of the left front side frame.

FIG. 11 is a perspective view of the left front side frame 25 and corresponding damper housing 26 provided in the vehicle front body structure 11, and FIG. 12 is a perspective view of the left front side frame 25.

In the vehicle front body structure 11, the damper housing connection bracket 36 is fixed to the front side frame 25 through spot welding at welding portions 37, a lower joint section 53 of the damper housing 26 is fixed to the damper housing connection bracket 36 through spot welding at welding portions 37. Further, the rear collar nut 142 projects upwardly within the front side frame 25, an upper section of the damper housing 26 is attached to the upper wheel-house member 42, and the sub frame 27 is supported via the rear collar nut 142.

The lid member 46 is fixed to the side frame body 45 of the front side frame 25 through spot welding at a plurality of welding portions 37, and an intermediate partition member 62 located beneath the lid member 46 and fixed to the side frame body 45 through spot welding at a plurality of welding portions 37. The side frame body 45, which is an elongated member of a generally U sectional shape, has inner and outer wall portions 164 and 165 and a bottom wall portion 166.

Further, the damper housing 26 has a front lower section 174 fitted in the side frame body 45 and fixed to the side frame body 45 through spot welding at a plurality of welding portions 37, and a rear lower section 175 fitted in the side frame body 45 and fixed to the side frame body 45 through spot welding at a plurality of welding portions 37.

The front lower section 174 is provided as a wall-shaped bulkhead under the front corner member 63 of the damper housing connection bracket 36. The rear lower section 175 is provided as a wall-shaped bulkhead structure 175 under the rear corner member 64 of the damper housing connection bracket 36.

The bulkhead structure and bulkhead are each in the form of a plate defining a wall that is fixed at one end to the inner wall portion 164 and fixed at the other end fixed to the outer wall portion 165 and that partitions the inside space of the front side frame 25 in the width direction of the vehicle.

The front corner member 63, which is a member formed by bending a steel plate into a substantially Z sectional shape, has a bulkhead section 176 formed into such a predetermined width as to be fitted between the inner and outer wall portions 164 and 165. Similarly, the rear corner member 64, which is a member formed by bending a steel plate into a substantially Z sectional shape, which includes a bulkhead section 177 formed into such a predetermined width as to be fitted between the inner and outer wall portions 164 and 165.

The damper housing 26 has the inner wall portion 82 integrally formed with the damper connecting upper portion 81 connecting with the front suspension damper 31, and the front and rear wall portions 83 and 84 formed integrally with the inner wall portion 82.

Figure 13:
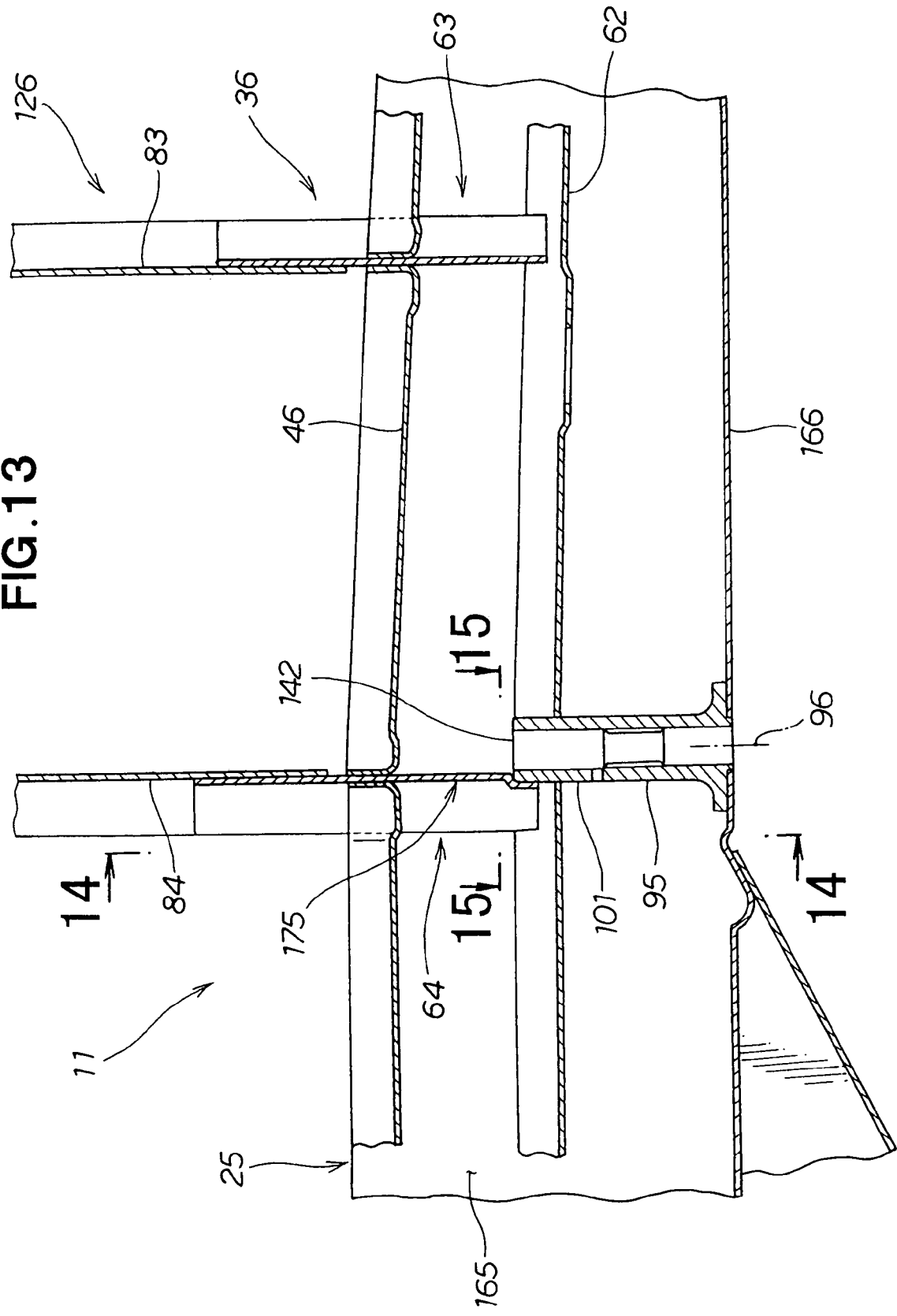
FIG. 13 is a sectional view taken along line 13-13 of FIG. 10.
Figure 14:
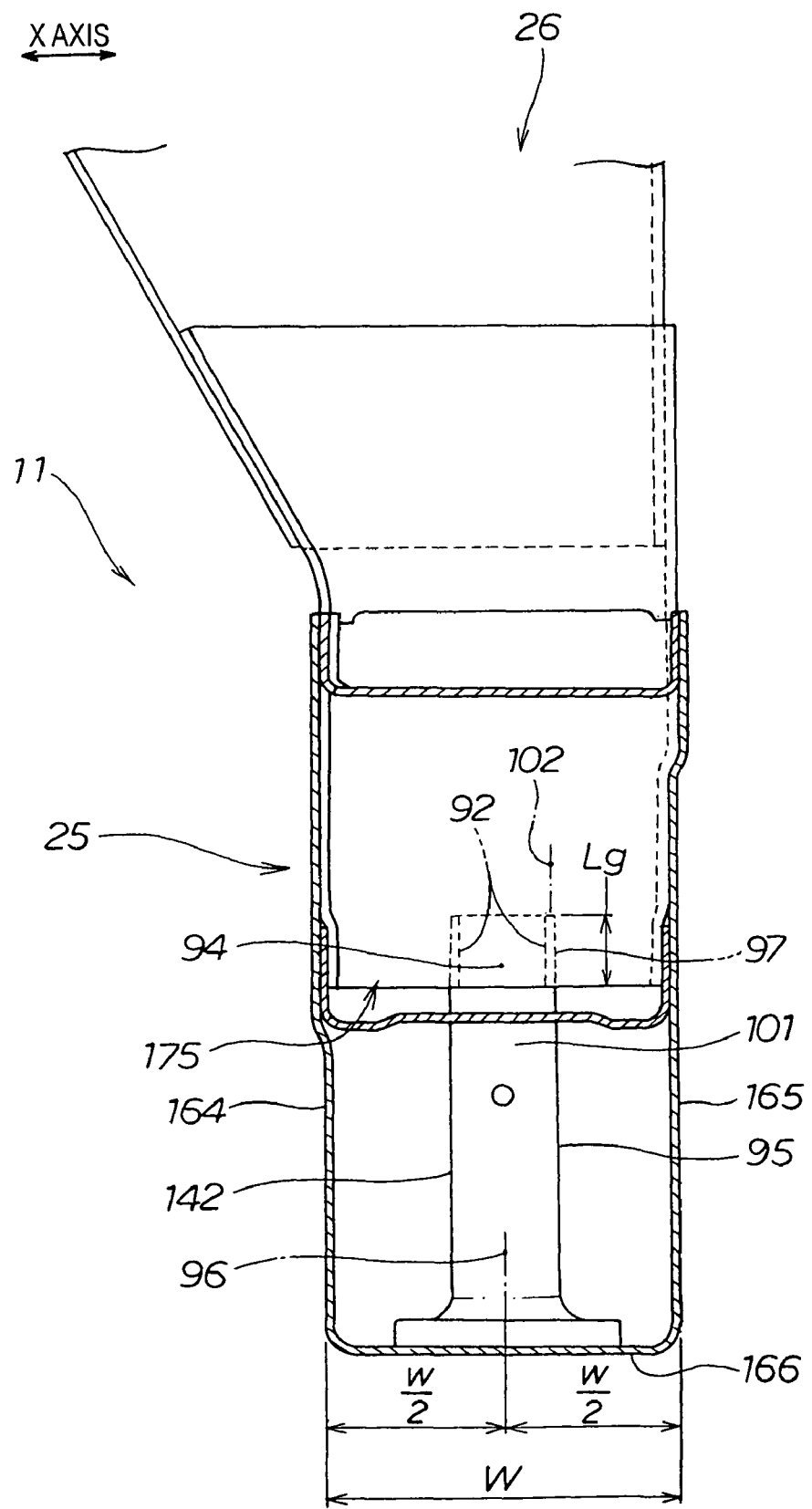
FIG. 14 is a sectional view taken along line 14-14 of FIG. 13.
Figure 15:
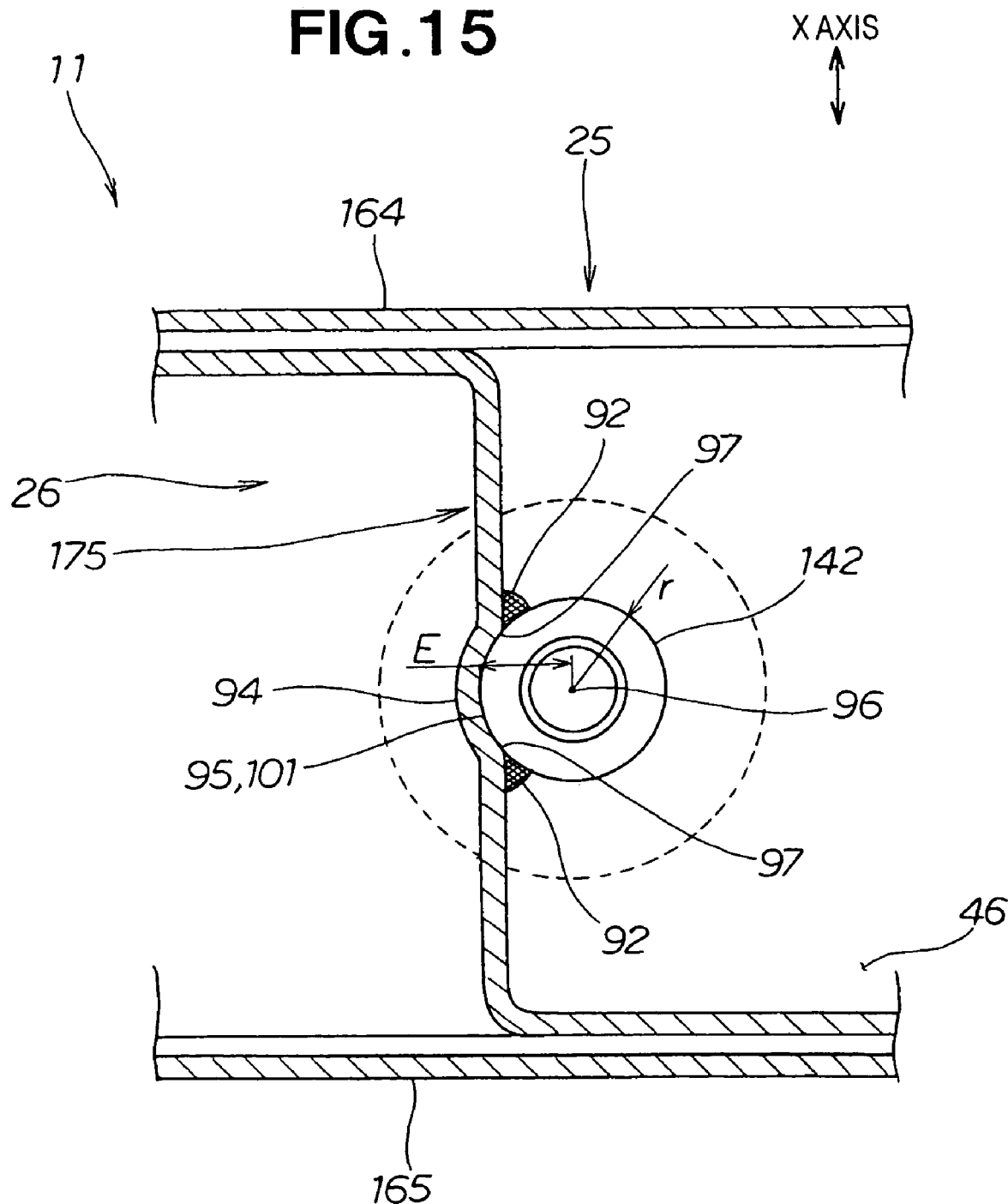
FIG. 15 is a sectional view taken along line 15-15 of FIG. 13.
Figure 16:
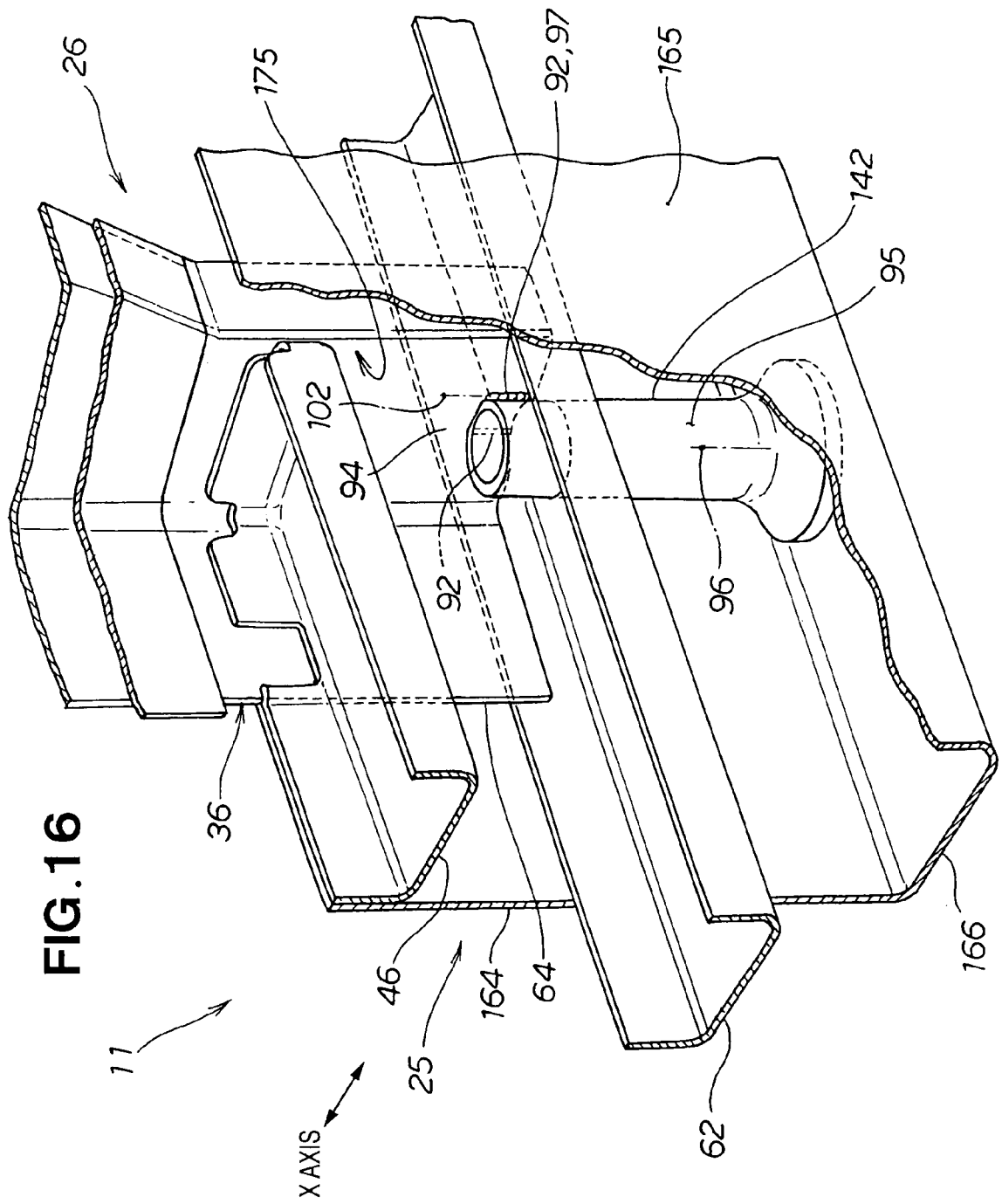
FIG. 16 is a view taken in a direction of arrow 7 of FIG. 10.

FIG. 13 is a sectional view taken along the 13-13 line f FIG. 10, FIG. 14 is a sectional view taken along the 14-14 line of FIG. 13, FIG. 15 is a sectional view taken along the 15-15 line of FIG. 13, and FIG. 16 is a view taken in a direction of arrow 7 of FIG. 10.

Further, in the vehicle front body structure 11, the rear lower section 175 of the damper housing 26 spans between the inner and outer wall portions 164 and 165, and the collar nut 142 is connected to a lower end portion of the damper housing's rear lower section 175.

More specifically, the collar nut 142 of a cylindrical shape is provided vertically on a middle region, in a vehicle width direction (i.e., X-axis direction), of the front side frame 25 and located inside of the damper housing 26 disposed over the collar nut 142. The collar nut 142 is fixed to the damper housing 26 via welding portions 92 formed by fillet welding using arc welding.

More specifically, the rear collar nut 142 is fixed at its outer surface 95 to a middle region 94 of the rear lower section 175 of the damper housing 26 so that no distance is left between the outer surface 95 of the thus-fixed rear collar nut 142 and the rear lower section 175 of the damper housing 26. The rear lower section 175 of the damper housing 26 is offset from the axis 96 of the collar nut 142 by a distance E equal to the radius r of the collar nut 142.

The "middle region, in the vehicle width direction (i.e., X-axis direction), of the front side frame 25" means a substantial middle of the width W (i.e., position corresponding to about 50% of the width W) of the front side frame 25, but also a substantial middle of the width W (i.e., position corresponding to about 50% of the width W) of the bottom wall portion 166.

The middle region 94 of the damper housing's rear lower section 175 has a fillet welding edge portion 97 formed thereon, and this fillet welding edge portion 97 has a length Lg and extends in parallel to the axis 96 of the collar nut 142 in close contact with the outer surface 95 of the collar nut 142. The "middle region 94 of the damper housing's rear lower section 175" represents a substantial middle of the width W1 (i.e., position corresponding to about 50% of the width W1) of the rear lower section 175.

The welding portions 92 are beads formed by welding together the fillet welding edge portions 97 of the damper housing's rear lower section 175 and a rear wall portion 101 of the collar nut 142, and the welding axis 102 of the welding portions 92 lies in substantial parallel to the axis 96 of the collar nut 142.

Next, a description will be given about behavior of the first embodiment of the vehicle front body structure 11 of the present invention. FIGS. 17A and 17B are views similar to FIGS. 7 and 4, respectively, which are explanatory of a load transmission mechanism in the first embodiment of the vehicle front body structure 11.

Once a load is applied from the sub frame 27 to the collar nut 142 as indicated by arrow a14, the load transmits straightly from the collar nut 142 not only to the damper housing's rear lower section 175 as indicated by arrow a15 but also to the damper housing's upper section as indicated by arrow a6. As a consequence, the front side frame 25 and collar nut 142 can be supported by the damper housing 26 having a great strength, and thus, the front side frame 25 can have an increased strength.

Although the foregoing have described how the vehicle front body structure 11 behaves when a load is applied substantially vertically upward from the sub frame 27 to the collar nut 142 as indicated by arrow a14, it should be noted that the vehicle front body structure 11 behaves similarly when a load is applied forward or rearward from the sub frame 27 to the collar nut 142 or applied outwardly or inwardly to the collar nut 142.

More specifically, in the vehicle front body structure 11, where the collar nut 142 is fixed at the outer surface 95 to the damper housing's rear lower section 175, no distance is left between the damper housing's rear lower section 175 and the outer surface 95 of the collar nut 142, so that no bending force (moment) is produced in the damper housing's rear lower section 175.

Further, because the welding axis 102 of the welding portions 92 for connecting the damper housing's rear lower section 175 to the collar nut 142 lies in substantial parallel to the axis 96 of the collar nut 142, a load applied from the collar nut 142 to the damper housing's rear lower section 175 as indicated by arrow a15 can be directed by the welding portions 92 along the ridge line of the rear lower section 175 (i.e., along the fillet welding edge portion 97). Thus, the instant embodiment of the vehicle front body structure 11 allows a greater load to be transmitted to the damper housing's rear lower section 175 as compared to conventional counterparts where a bending force (moment) is produced in the damper housing's rear lower section.

Figure 18:
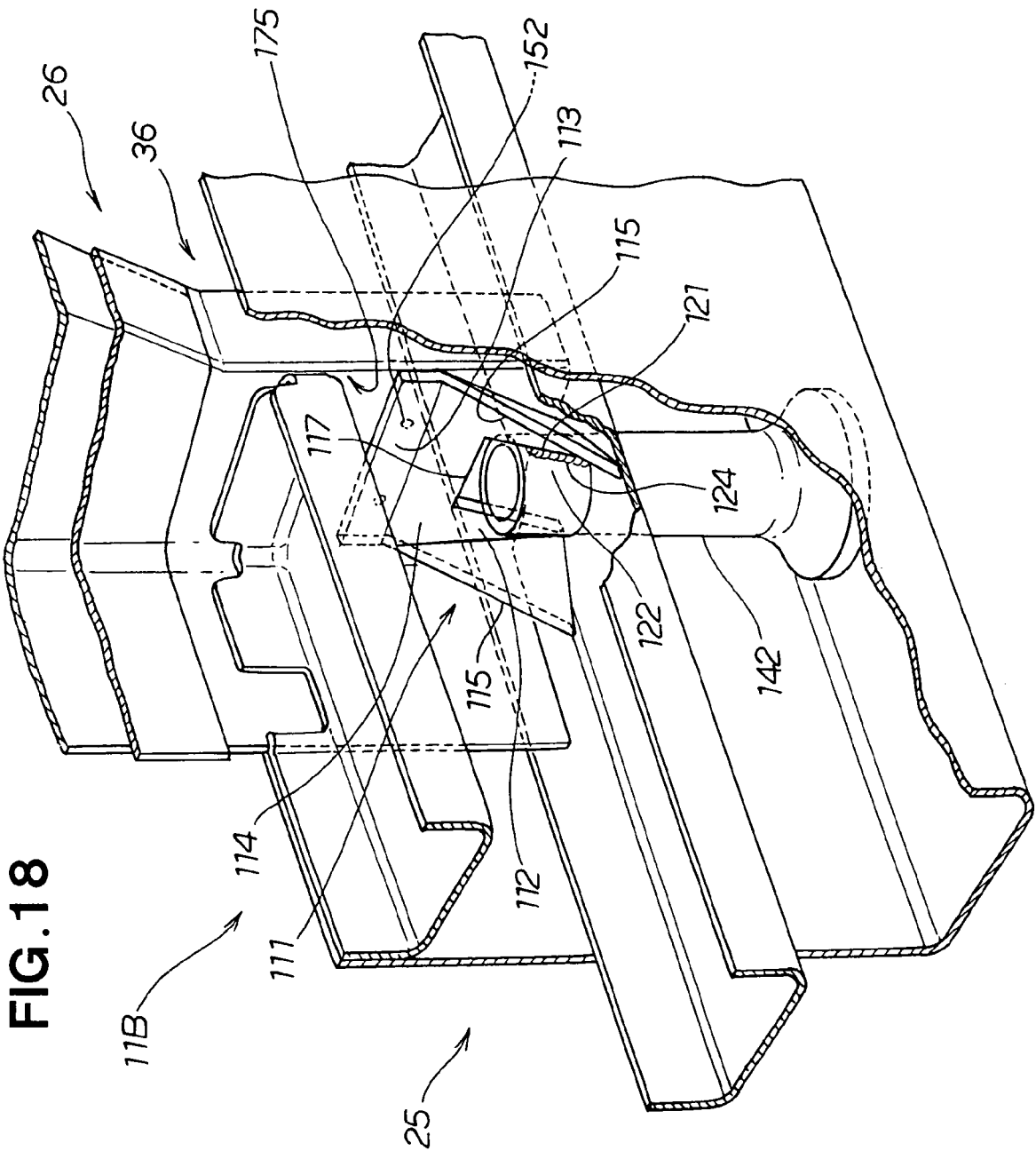
FIG. 18 is a perspective view of a second embodiment of the vehicle front body structure of the present invention.
Figure 19:
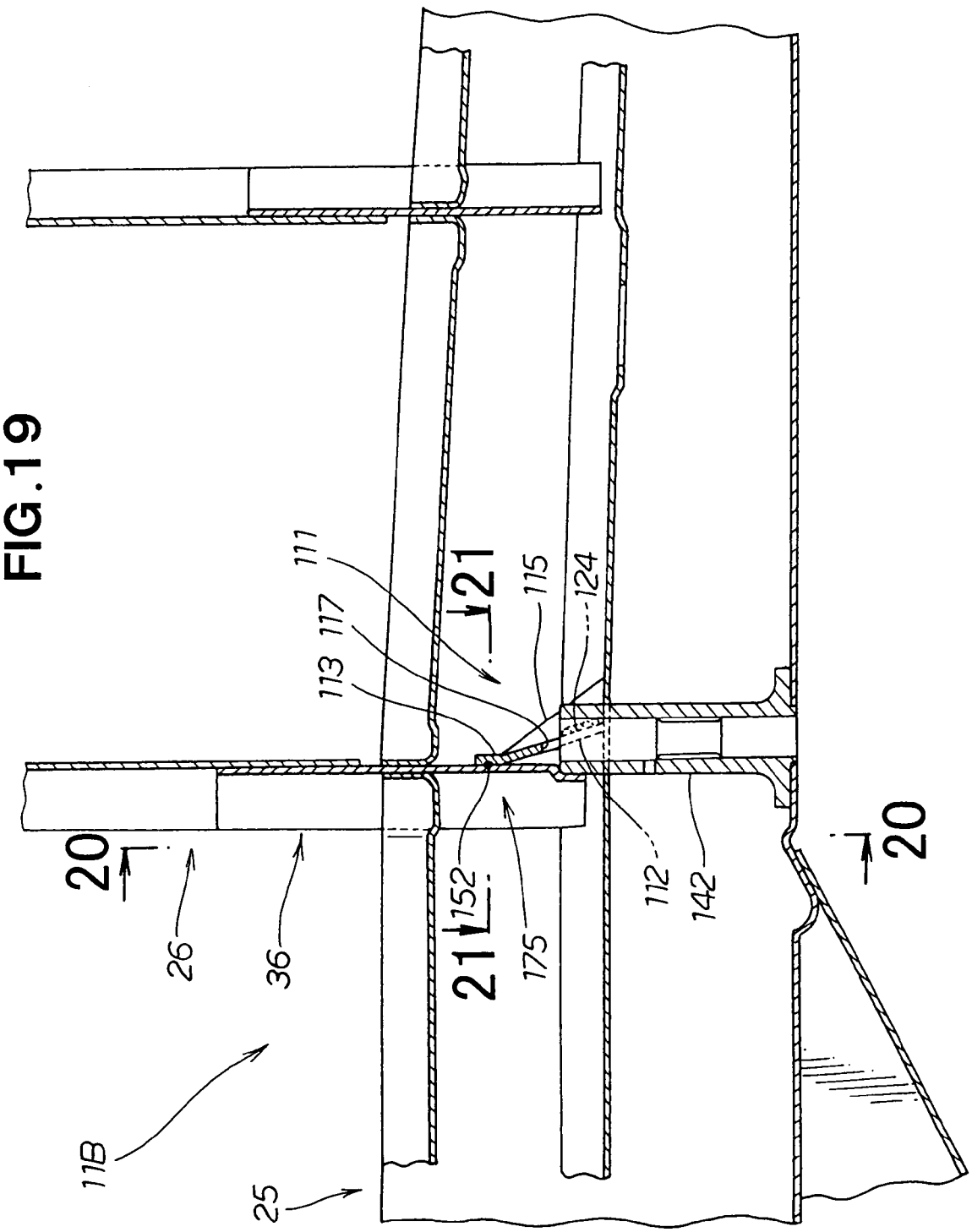
FIG. 19 is a sectional view of the second embodiment of the vehicle front body structure.
Figure 20:
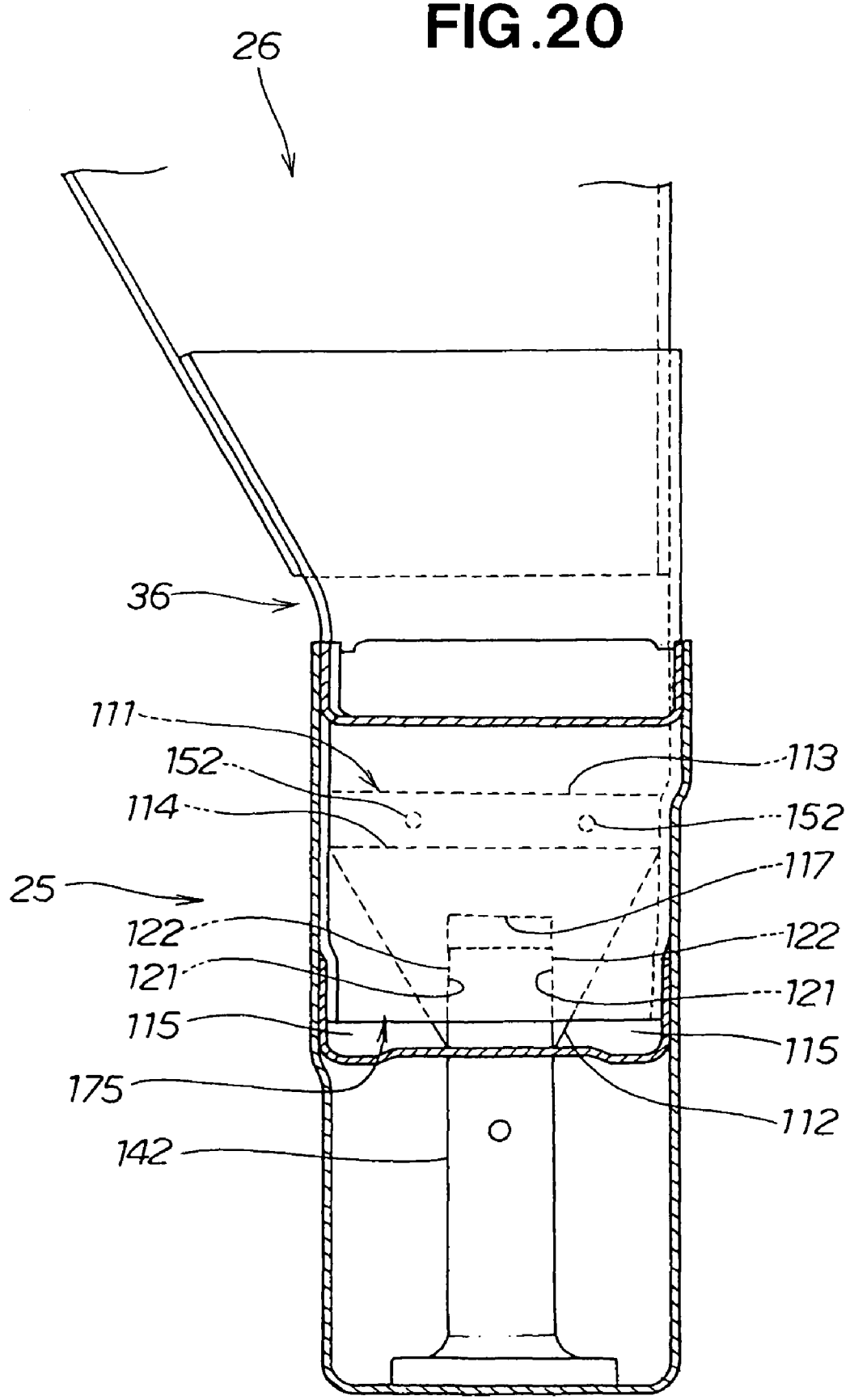
FIG. 20 is a sectional view taken along line 20-20 of FIG. 19.
Figure 21:
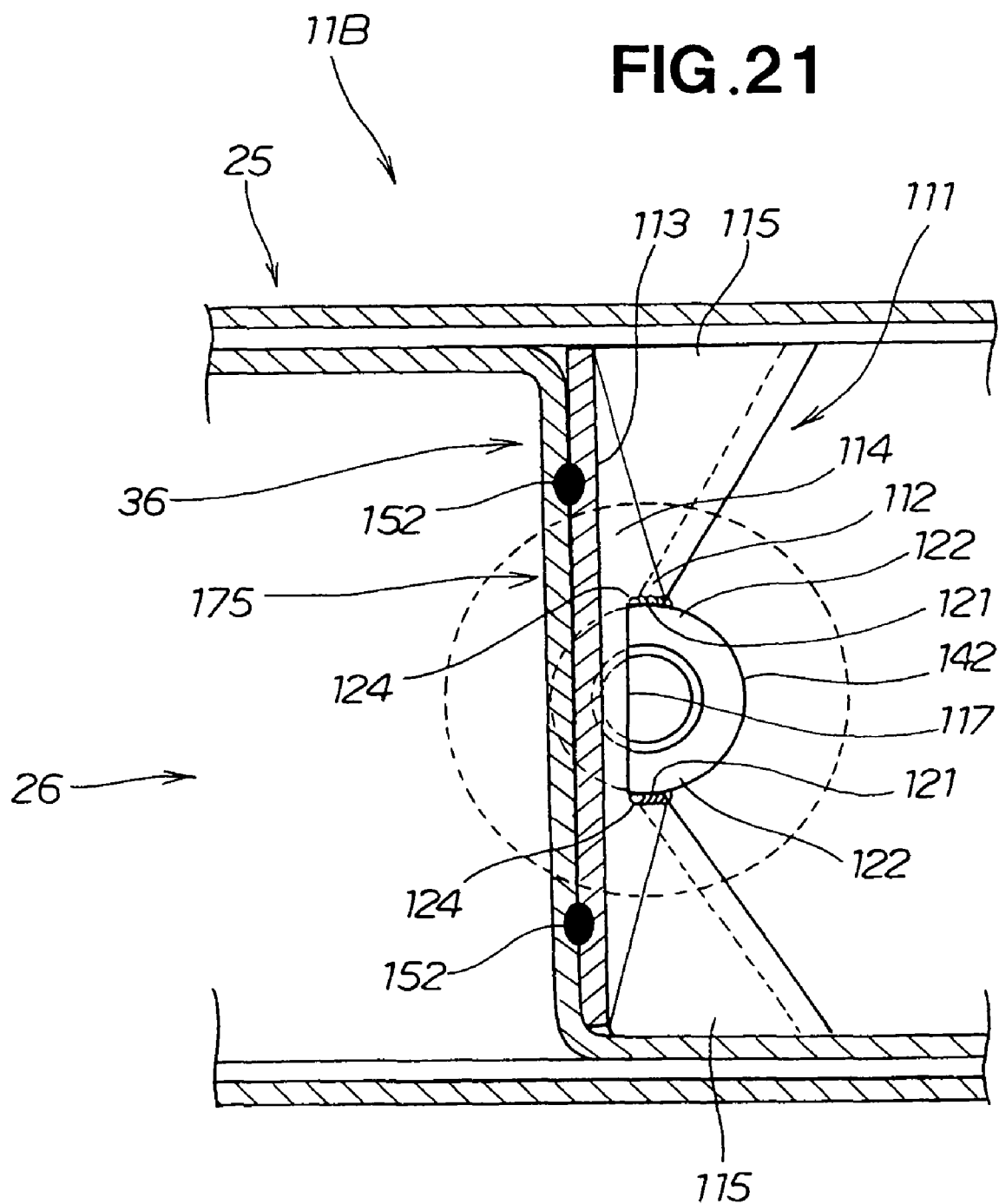
FIG. 21 is a sectional view taken along line 21-21 of FIG. 19.

Next, a description will be given about a second embodiment of the vehicle front body structure of the present invention. FIG. 18 is a perspective view of the second embodiment of the vehicle front body structure 11B, which corresponds to FIG. 16. FIG. 19 is a sectional view of the second embodiment of the vehicle front body structure 11B, which corresponds to FIG. 13. FIG. 20 is a sectional view taken along the 20-20 line of FIG. 19, which corresponds to FIG. 14. FIG. 21 is a sectional view taken along the 21-21 line of FIG. 19, which corresponds to FIG. 15. Similar elements to those in the first embodiment shown in FIGS. 1-8 are indicated by the same reference numerals and characters as used for the first embodiment and will not be described here to avoid unnecessary duplication.

The second embodiment of the vehicle front body structure 11B is characterized by provision of a bracket 111 that connects the collar nut 142 to the bulkhead structure (damper housing's rear lower section) 175.

The bracket 111 has a plate-shaped body section 114 fixed at one end portion 112 to the collar nut 142 and fixed at another end portion 113 to the bulkhead structure (damper housing's rear lower section) 175, and a rib section 115 formed integrally with the body section 114.

The other end portion 113 of the plate-shaped body section 114 is fixed to the bulkhead structure (damper housing's rear lower section) 175 through spot welding at welding portions 152. The one end portion 112 of the plate-shaped body section 114 has a recessed portion 117 fitted over the collar nut 142, and fillet welding edge portions 121 that are fixed to opposite outer surface portions 122 of the collar nut 142 through spot welding at welding portions 124. Distance between the opposite outer surface portions 122 is equal to the outer diameter of the collar nut 142.

Figure 22:
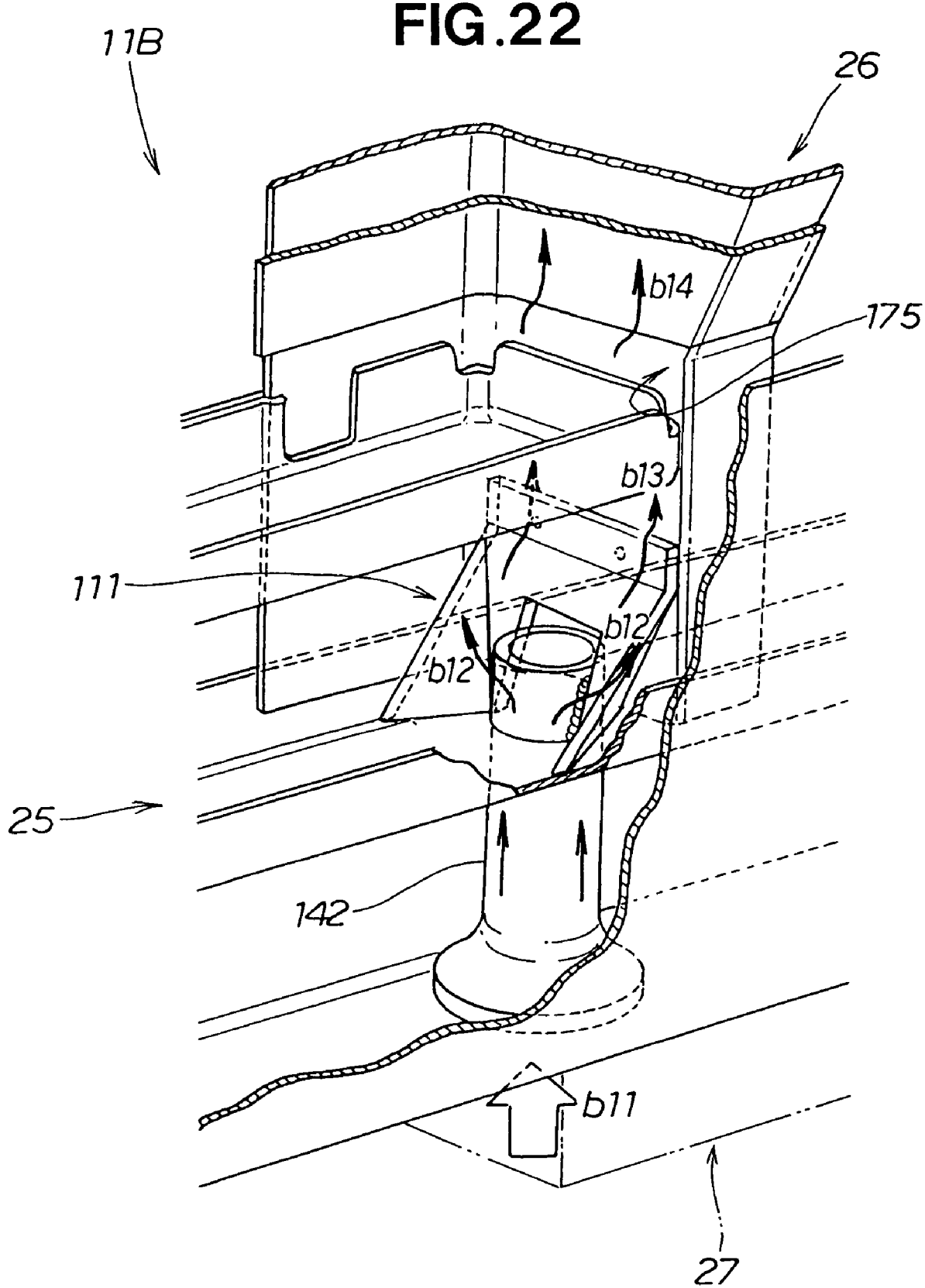
FIG. 22 is a view explanatory of a load transmission mechanism in the second embodiment of the vehicle front body structure.

FIG. 22 is a view explanatory of a load transmission mechanism in the second embodiment of the vehicle front body structure 11B. The second embodiment of the vehicle front body structure 11B achieves behavior and advantageous benefits similar to those achieved by the first embodiment of the vehicle front body structure 11B.

In the second embodiment of the vehicle front body structure 11B, once a load is applied from the sub frame 27 to the collar nut 142 as indicated by arrow b11, the load transmits from the collar nut 142 not only to the bracket 111 as indicated by arrow b12 and then to the damper housing's rear lower section 175 as indicated by arrow b13 but also straightly to the damper housing 26 as indicated by arrow b14. In this way, the front side frame 25 can have an increased strength.

Although the foregoing have described how the vehicle front body structure 11B behaves when a load is applied substantially vertically upward from the sub frame 27 to the collar nut 142, it should be noted that the vehicle front body structure 11B behaves similarly when a load is applied forward or rearward from the sub frame 27 to the collar nut 142 or applied outwardly or inwardly to the collar nut 142.

Whereas the preferred embodiments of the vehicle front body structure of the present invention have been described as applied to a vehicle, the basic principles of the present invention can also be used in other applications than vehicles, such as industrial machines and apparatus having a frame or bed.

The vehicle front body structure of the present invention is well suited for connection between the damper housings and the front side frames disposed under the damper housings.

Obviously, various minor changes and modifications of the present invention are possible in light of the above teaching. It is therefore to be understood that within the scope of the appended claims the invention may be practiced otherwise than as specifically described.

What is claimed is:

1. A vehicle front body structure comprising:
   left and right damper housings having mounted thereto respective upper portions of left and right front suspension dampers;
   left and right front side frames having respective ones of the left and right damper housings attached thereto, each of the left and right front side frames having a side frame body of a substantially U sectional shape with an upwardly oriented opening;
   left and right damper housing connection brackets each inserted in the opening of the side frame body of a corresponding one of the left and right front side frames and thereby fixed to the side frame body of the corresponding left or right front side frame;
   left and right welding connection sections each formed on the corresponding left or right damper housing in such a shape as to be fixed to a corresponding one of the damper housing connection brackets;
   left and right lid members each fitted in the opening of the side frame body of the corresponding left or right front side frame to thereby form the front side frame as a structure of a closed sectional shape; and
   wherein each of the damper housing connection brackets comprises a corner member formed by bending a steel plate and having a rib section partitioning an inside space of the corresponding left or right front side frame, and corner portions of the left and right damper housings are lapped over the corner members of respective ones of the left and right damper housing connection brackets.

2. A vehicle front body structure comprising:
   left and right damper housings having mounted thereto respective upper portions of left and right front suspension dampers;
   left and right front side frames having respective ones of the left and right damper housings attached thereto, each of the left and right front side frames having a side frame body of a substantially U sectional shape with an upwardly oriented opening;
   left and right damper housing connection brackets each inserted in the opening of the side frame body of a corresponding one of the left and right front side frames and thereby fixed to the side frame body of the corresponding left or right front side frame;
   left and right welding connection sections each formed on the corresponding left or right damper housing in such a shape as to be fixed to a corresponding one of the damper housing connection brackets;
   left and right lid members each fitted in the opening of the side frame body of the corresponding left or right front side frame to thereby form the front side frame as a structure of a closed sectional shape; and
   a sub frame connected from below to the left and right front side frames; and collar nuts provided within respective ones of the left and right front side frames and projecting upward from the front side frames to support the sub frame; and wherein each of the damper housings has a lower section connected to a corresponding one of the collar nuts.

3. The vehicle front body structure according to claim 2, wherein the lower section of each of the left and right damper housings is provided as a wall-shaped bulkhead structure that partitions an inside space of a corresponding one of the left and right front side frames in a width direction of the vehicle.

4. The vehicle front body structure according to claim 3, further comprising brackets connecting the collar nuts to the bulkhead structures of the left and right damper housings.

5. The vehicle front body structure according to claim 2, wherein the lower section of each of the damper housings is fixed to the corresponding collar nut by welding at a welding portion, and the welding portion has a welding axis parallel to an axis of the collar nut.

* * * * *